Aug. 19, 1952  F. FISHER  2,607,071
PLUCKING MACHINE
Filed Dec. 29, 1948  14 Sheets-Sheet 1

INVENTOR.
Foster Fisher
BY
Barlow & Barlow
ATTORNEYS

Aug. 19, 1952 — F. FISHER — 2,607,071
PLUCKING MACHINE
Filed Dec. 29, 1948 — 14 Sheets-Sheet 2
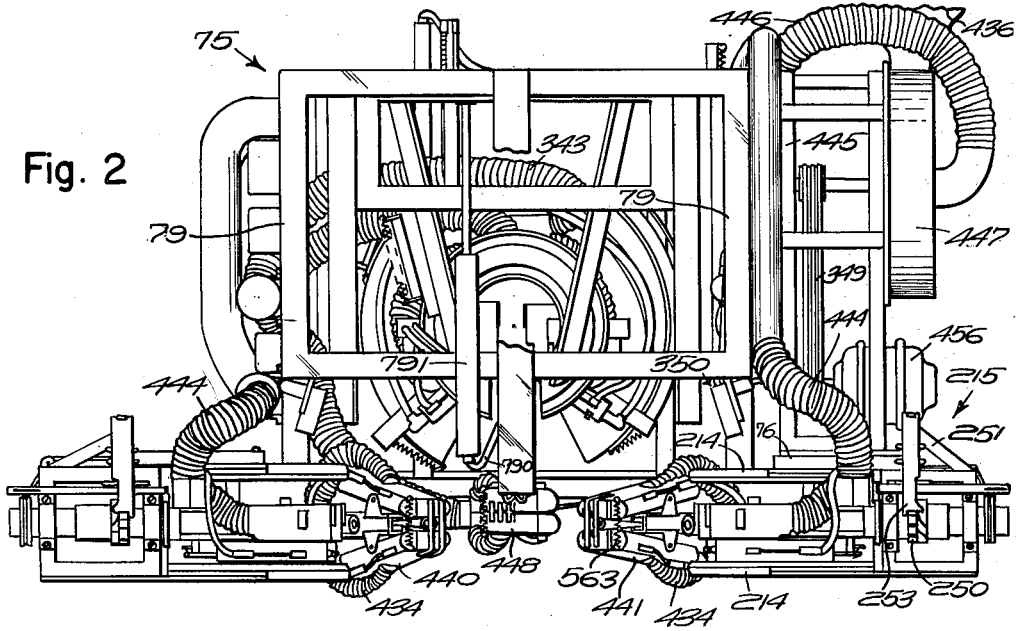
Fig. 2
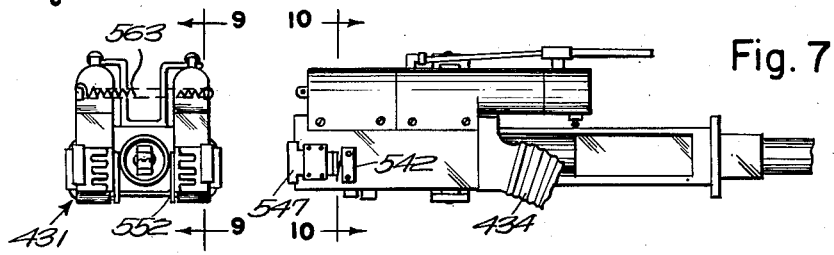
Fig. 8  Fig. 7
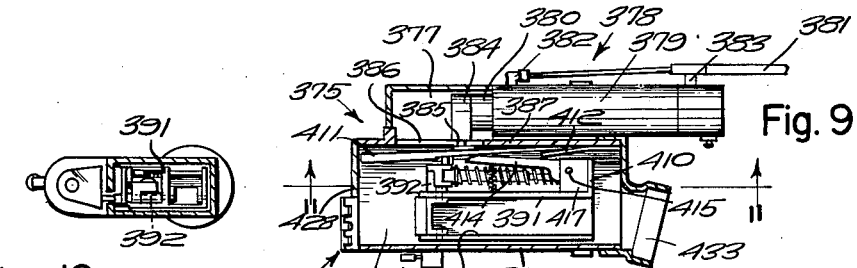
Fig. 9
Fig. 10
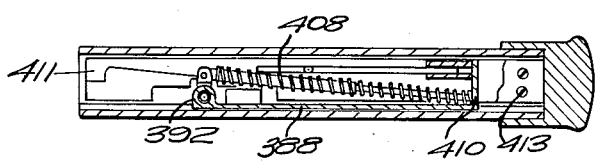
Fig. 11
INVENTOR.
Foster Fisher
BY Barlow & Barlow
ATTORNEYS Aug. 19, 1952      F. FISHER      2,607,071
PLUCKING MACHINE
Filed Dec. 29, 1948      14 Sheets-Sheet 3
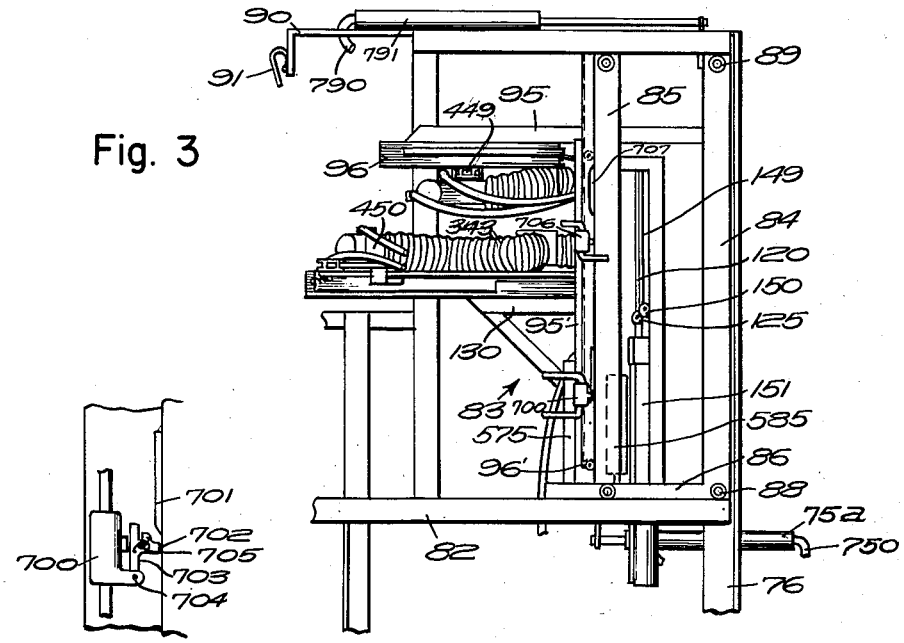
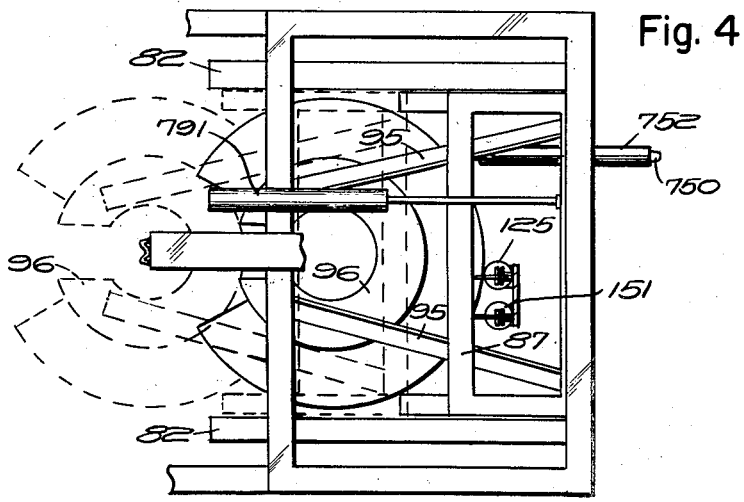
INVENTOR.
Foster Fisher
BY Barlow & Barlow
ATTORNEYS Aug. 19, 1952  F. FISHER  2,607,071
PLUCKING MACHINE
Filed Dec. 29, 1948  14 Sheets-Sheet 4
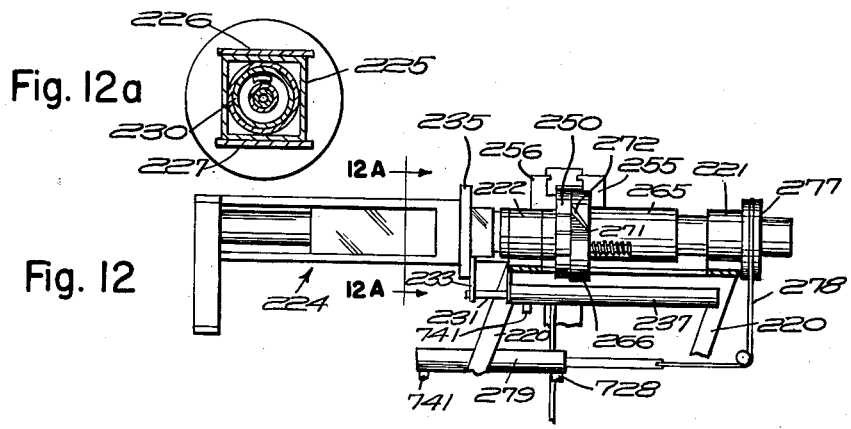
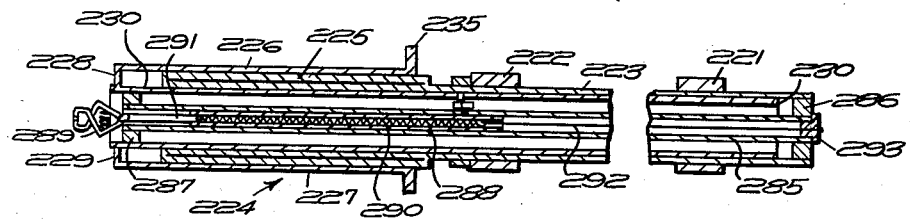
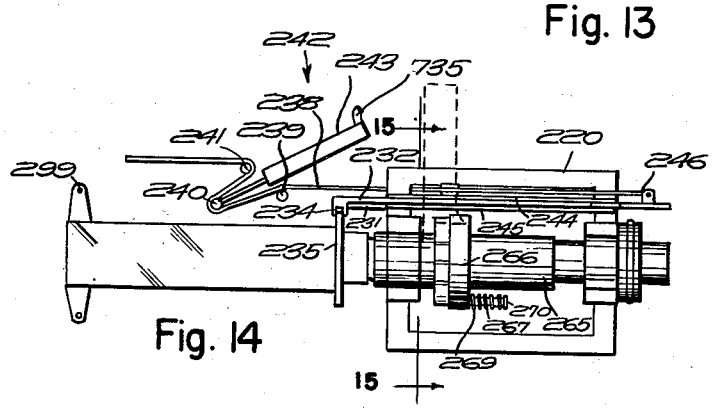
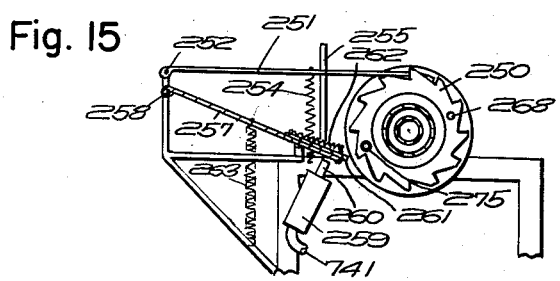
INVENTOR.
Foster Fisher
BY Barlow & Barlow
ATTORNEYS Aug. 19, 1952     F. FISHER     2,607,071
PLUCKING MACHINE
Filed Dec. 29, 1948     14 Sheets-Sheet 5

INVENTOR.
Foster Fisher
BY *Barlow & Barlow*
ATTORNEYS

Aug. 19, 1952      F. FISHER      2,607,071
PLUCKING MACHINE
Filed Dec. 29, 1948      14 Sheets-Sheet 6
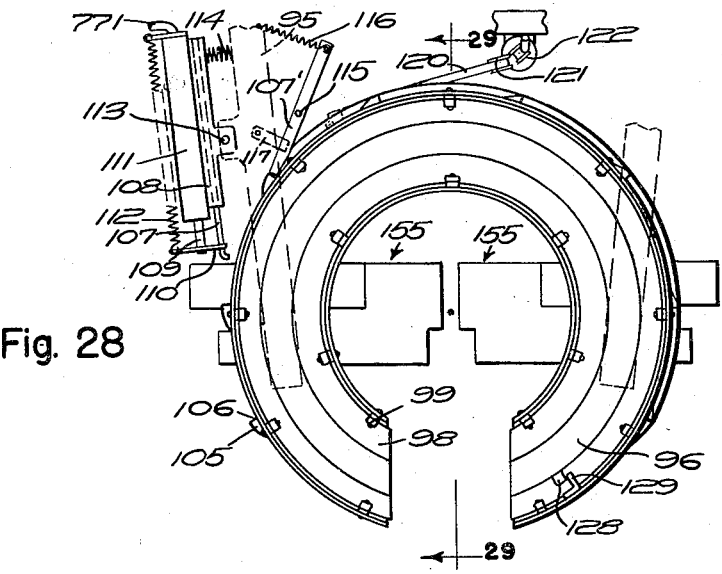
Fig. 28
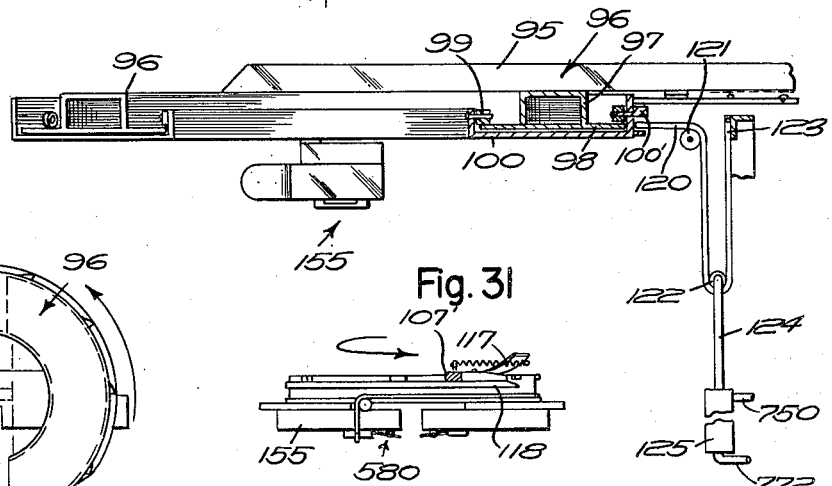
Fig. 29
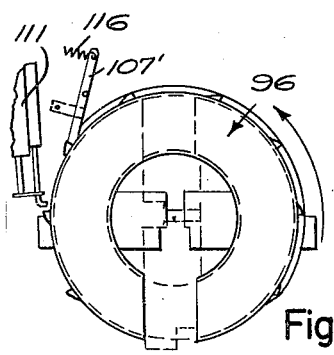
Fig. 30
Fig. 31
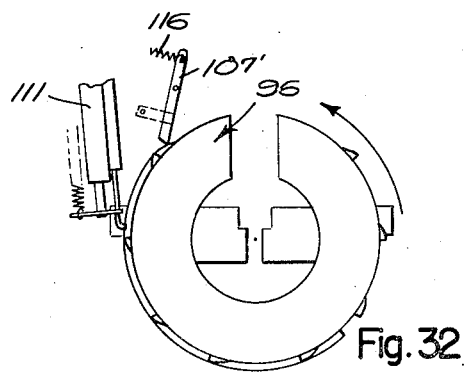
Fig. 32
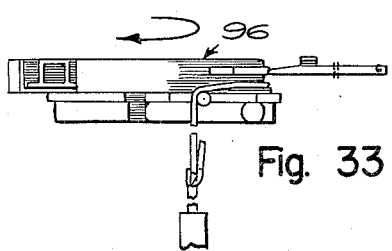
Fig. 33
INVENTOR.
Foster Fisher
BY *Barlow & Barlow*
ATTORNEYS Aug. 19, 1952  F. FISHER  2,607,071
PLUCKING MACHINE
Filed Dec. 29, 1948  14 Sheets-Sheet 7
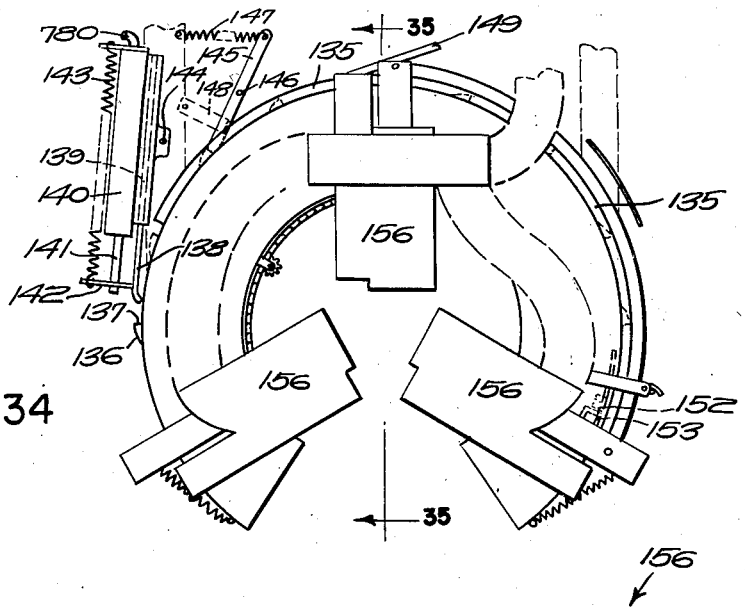
Fig. 34
Fig. 35
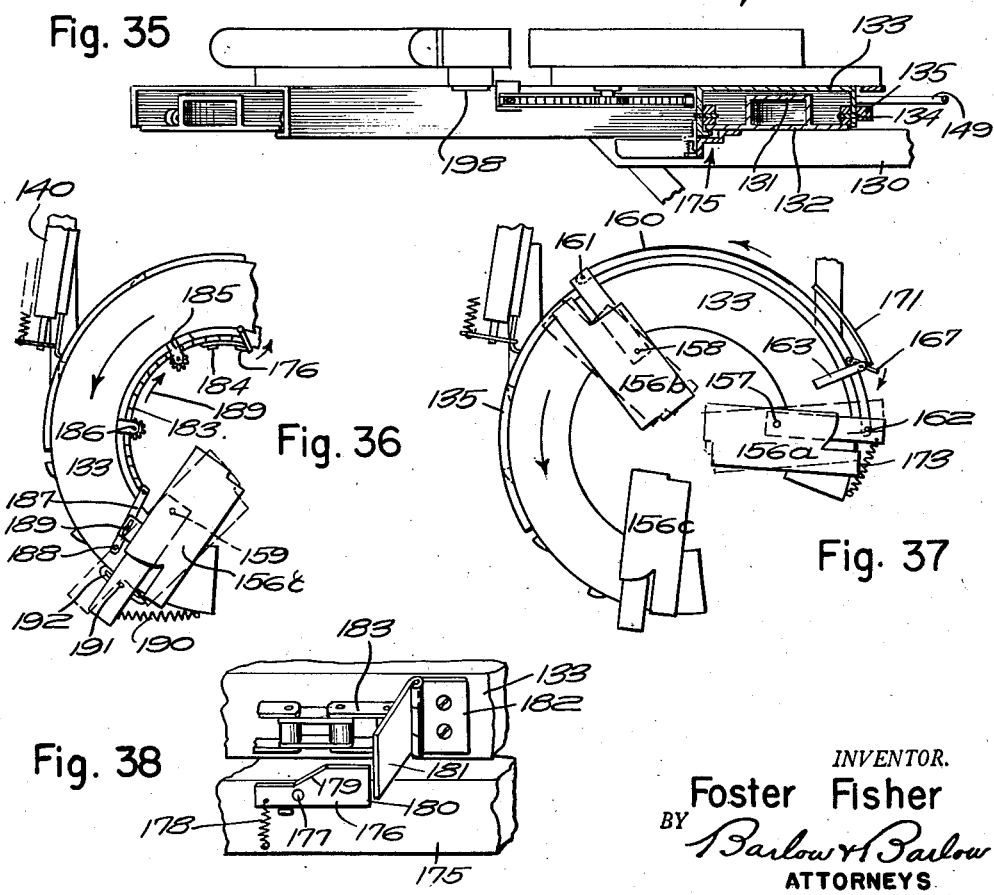
Fig. 36
Fig. 37
Fig. 38
INVENTOR.
Foster Fisher
BY Barlow & Barlow
ATTORNEYS Aug. 19, 1952 F. FISHER 2,607,071
PLUCKING MACHINE
Filed Dec. 29, 1948 14 Sheets-Sheet 8

*INVENTOR.*
Foster Fisher
BY Barlow & Barlow
ATTORNEYS

Aug. 19, 1952  F. FISHER  2,607,071
PLUCKING MACHINE
Filed Dec. 29, 1948  14 Sheets-Sheet 9

INVENTOR.
Foster Fisher
BY Barlow & Barlow
ATTORNEYS

Aug. 19, 1952 F. FISHER 2,607,071
PLUCKING MACHINE
Filed Dec. 29, 1948 14 Sheets-Sheet 10
Fig. 50
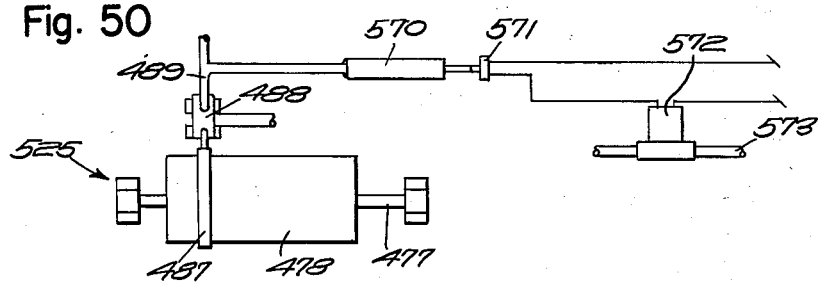
Fig. 51
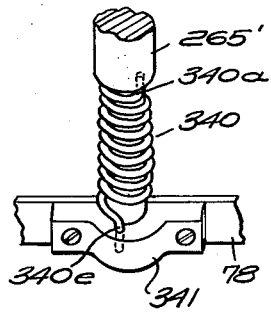
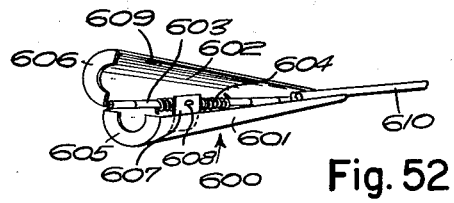
Fig. 52
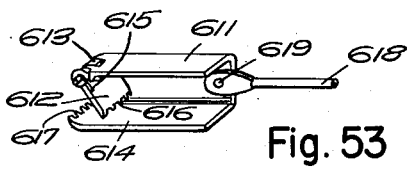
Fig. 53
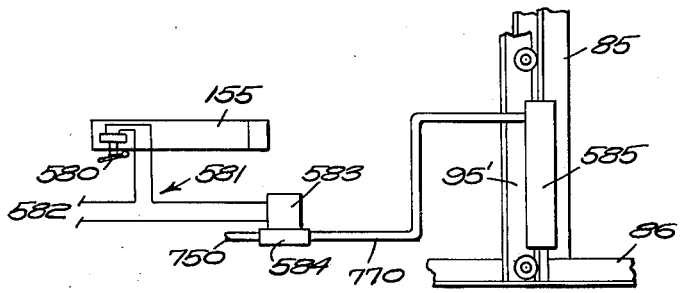
Fig. 54
INVENTOR.
Foster Fisher
BY *Barlow & Barlow*
ATTORNEYS Aug. 19, 1952     F. FISHER     2,607,071
PLUCKING MACHINE
Filed Dec. 29, 1948     14 Sheets-Sheet 11
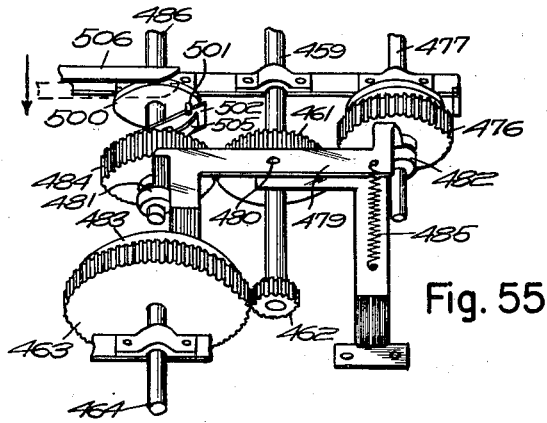
Fig. 55
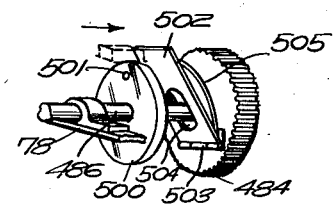
Fig. 56
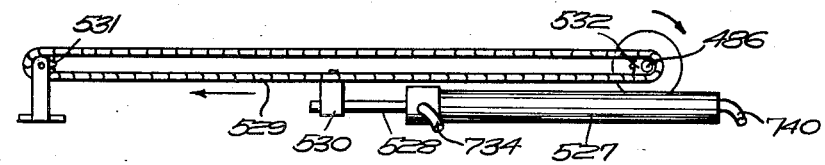
Fig. 57
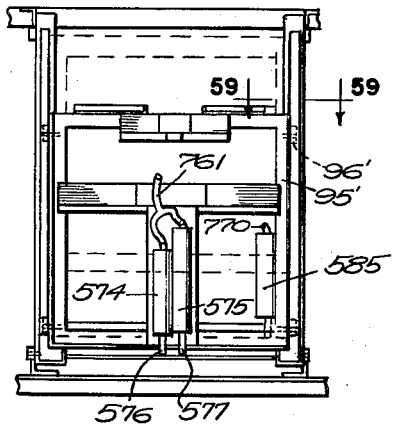
Fig. 58
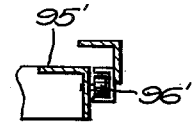
Fig. 59
Fig. 60
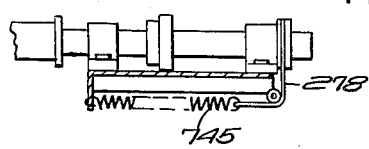
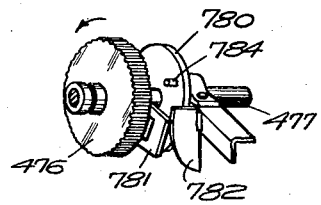
Fig. 61
INVENTOR.
Foster Fisher
BY
*Barlow & Barlow*
ATTORNEYS Aug. 19, 1952 F. FISHER 2,607,071
PLUCKING MACHINE
Filed Dec. 29, 1948 14 Sheets-Sheet 12
Fig. 62
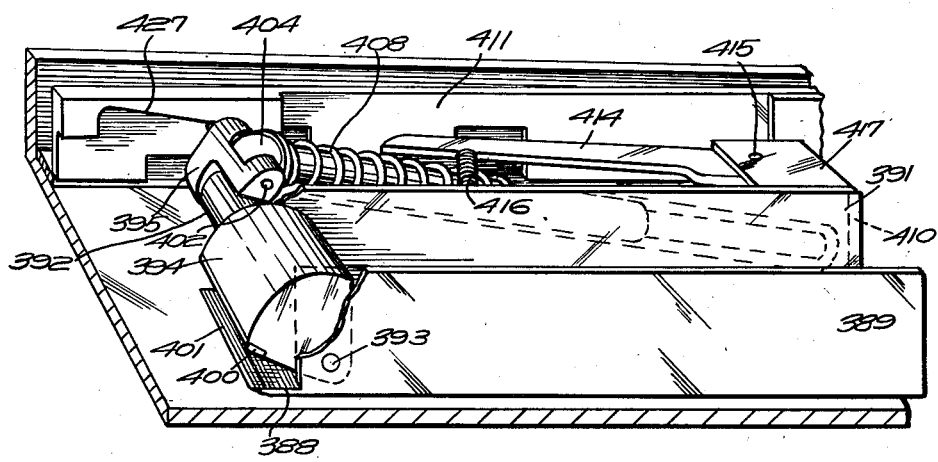
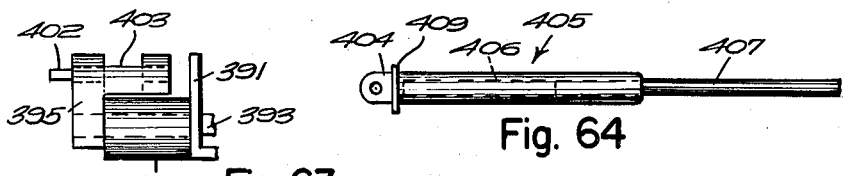
Fig. 63 Fig. 64
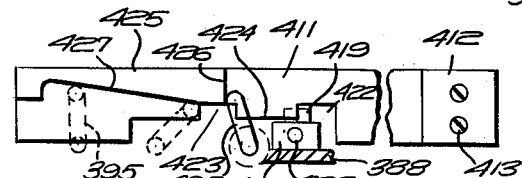
Fig. 65
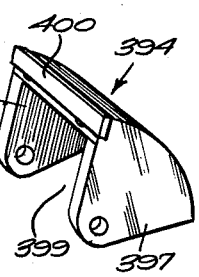
Fig. 66
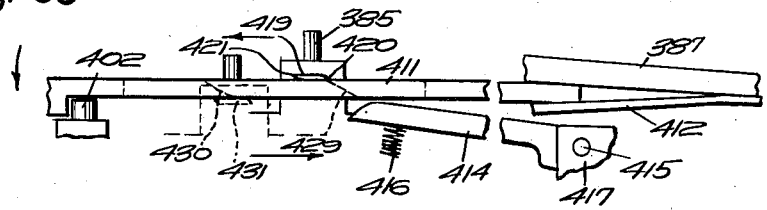
Fig. 67
INVENTOR.
Foster Fisher
BY *Barlow & Barlow*
ATTORNEYS Aug. 19, 1952     F. FISHER     2,607,071
PLUCKING MACHINE
Filed Dec. 29, 1948     14 Sheets-Sheet 14
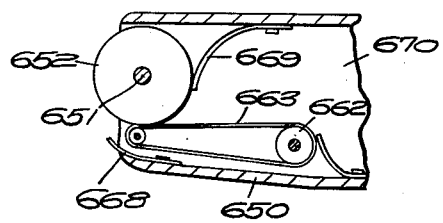
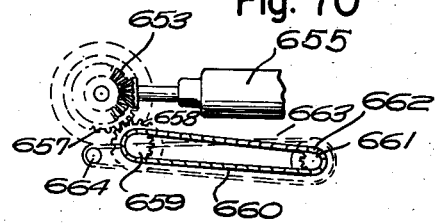
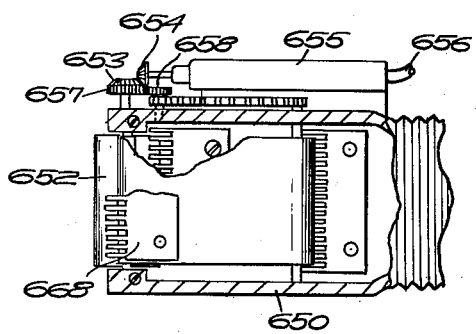
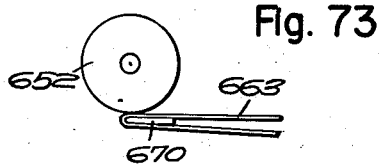
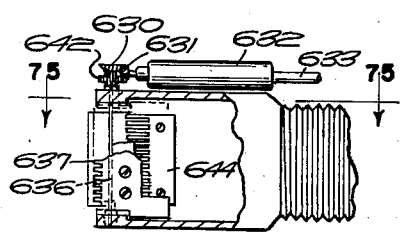
INVENTOR.
Foster Fisher
BY Barlow & Barlow
ATTORNEYS Patented Aug. 19, 1952

2,607,071

UNITED STATES PATENT OFFICE 2,607,071

PLUCKING MACHINE

Foster Fisher, Providence, R. I., assignor of one-half to Benjamin E. Kinne, Rehoboth, Mass.

Application December 29, 1948, Serial No. 67,774

8 Claims. (Cl. 17—11.1)

This invention relates to a machine for plucking the feathers from a bird.

One of the objects of this invention is to provide a machine in which a bird may be placed and by throwing one or more switches, all of the feathers will be plucked from the bird automatically without the necessity of further control by the operator.

Another object of this invention is to provide a plucking machine in which it is merely necessary to attach gripping devices to the neck, limbs, and tail of the bird and then actuate a control to cause devices to operate upon the bird automatically and in series, one after the other until all of the feathers are plucked from the bird.

Another object of this invention is to provide plucking units for the bird which will adjust themselves to irregularities of the bird in following the surface of the body and limbs of the bird.

Another object of this invention is to dry pluck all of the feathers from the bird automatically leaving no feathers for hand operation.

Another object of this invention is to collect the feathers as they are plucked from the bird and convey them to a common repository.

Another object of this invention is to operate the plucking units in a desired sequence of operation with the desired results to be performed and so that one plucking unit will not interfere with another.

Another object of the invention is to use different pluckers for different parts of the bird whereby each plucker may be better designed for its particular function on the portion upon which it operates.

Another object of the invention is to adjust the pluckers for different size of birds or parts of the bird.

Another object of the invention is to fix the bird in position and cause the pluckers to approach the bird and pluck the feathers therefrom.

With these and other objects in view, the invention consists of certain novel features of construction, as will be more fully described and particularly pointed out in the appended claims.

In the accompanying drawings:

Figure 2 is a top plan view of the entire machine;

Figure 3 is an elevation of the center unit detached from the remainder of the machine;

Figure 4 is a top plan view of the center unit shown in Figure 3;

Figure 5 is an elevation of a detail showing the operation of a valve shown in Figure 3, and taken at right angles to the showing in Figure 3;

Figure 7 is a side elevation of one of the plucking units;

Figure 8 is an end view thereof;

Figure 9 is a sectional view substantially on line 9—9 of Figure 8;

Figure 10 is a sectional view on line 10—10 of Figure 7;

Figure 11 is a sectional view on substantially line 11—11 of Figure 9;

Figure 12 is an elevation showing the plucking unit as mounted upon a carriage for its operation;

Figure 17:
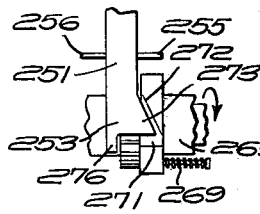
Figure 19:
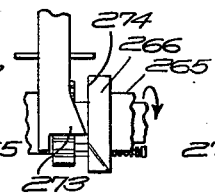
Figure 21:
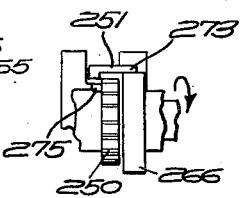
Figure 23:
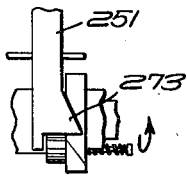
Figure 18:
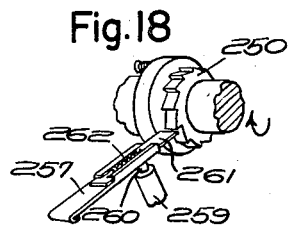
Figure 20:
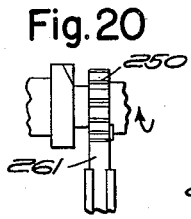
Figure 22:
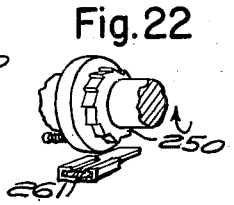
Figure 24:
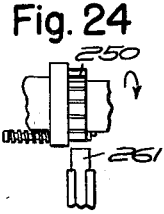
Figure 25:
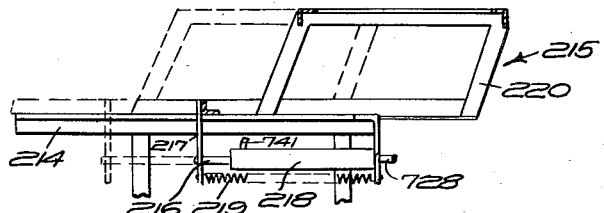
Figure 27:
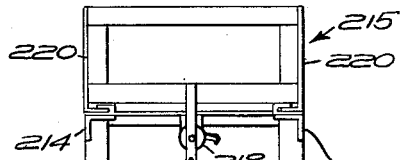
Figure 26:
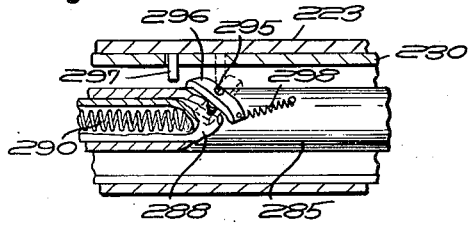
Figure 39:
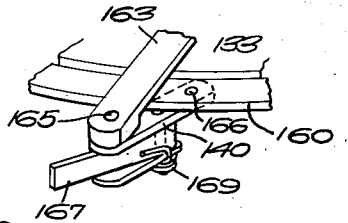
Figure 40:
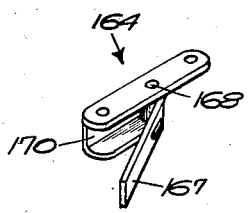
Figure 41:
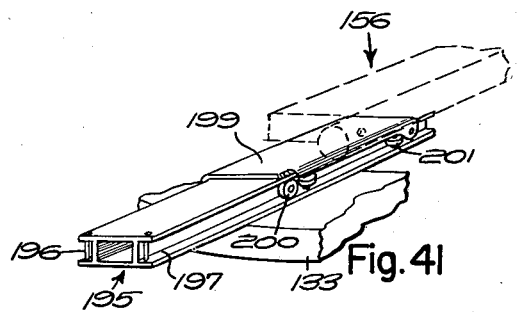
Figure 42:
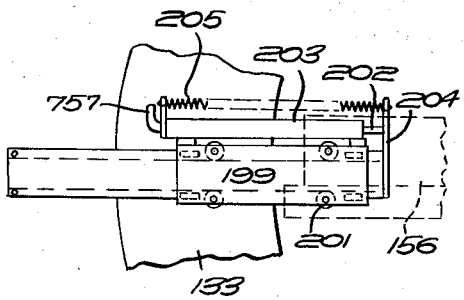
Figure 43:
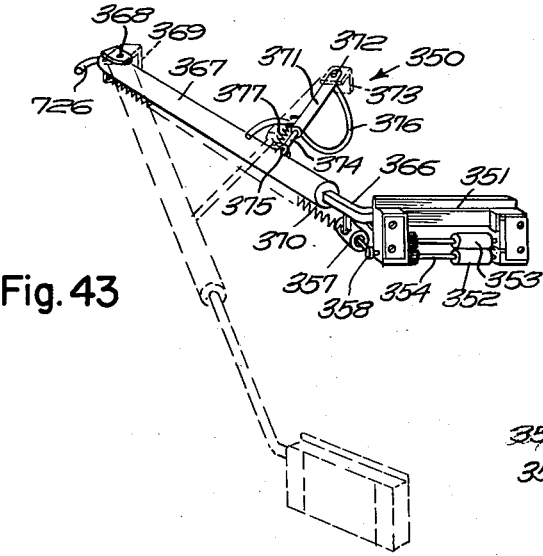
Figure 44:
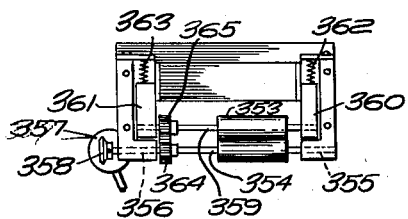
Figure 45:
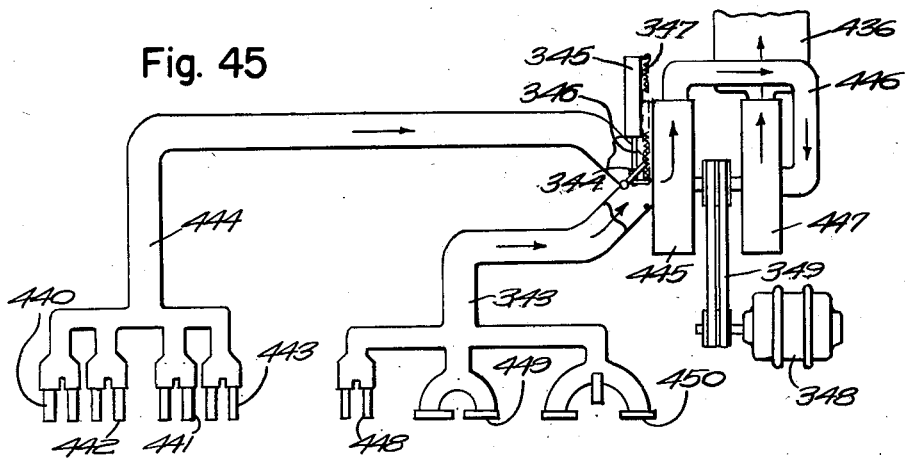
Figure 46:
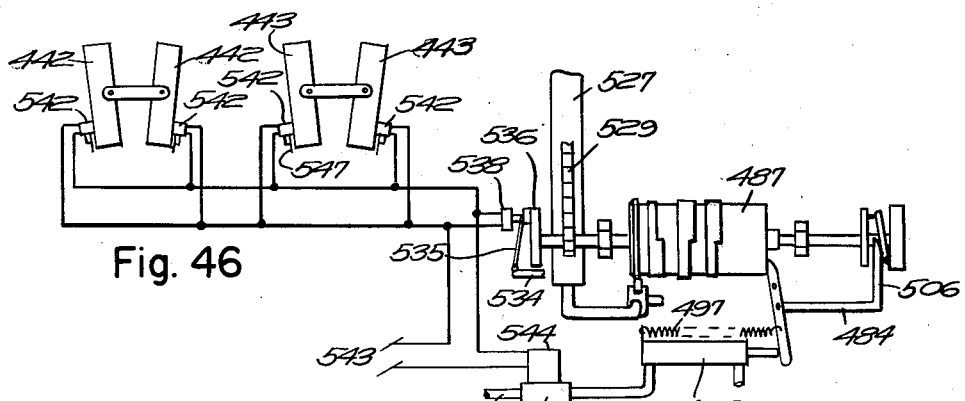
Figure 47:
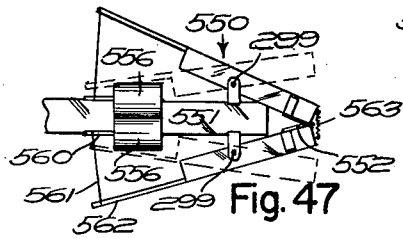
Figure 48:
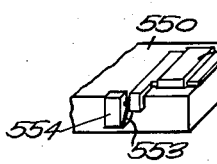
Figure 49:
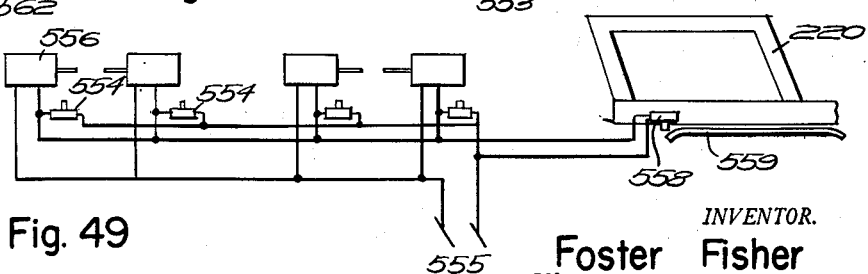
Figure 68:
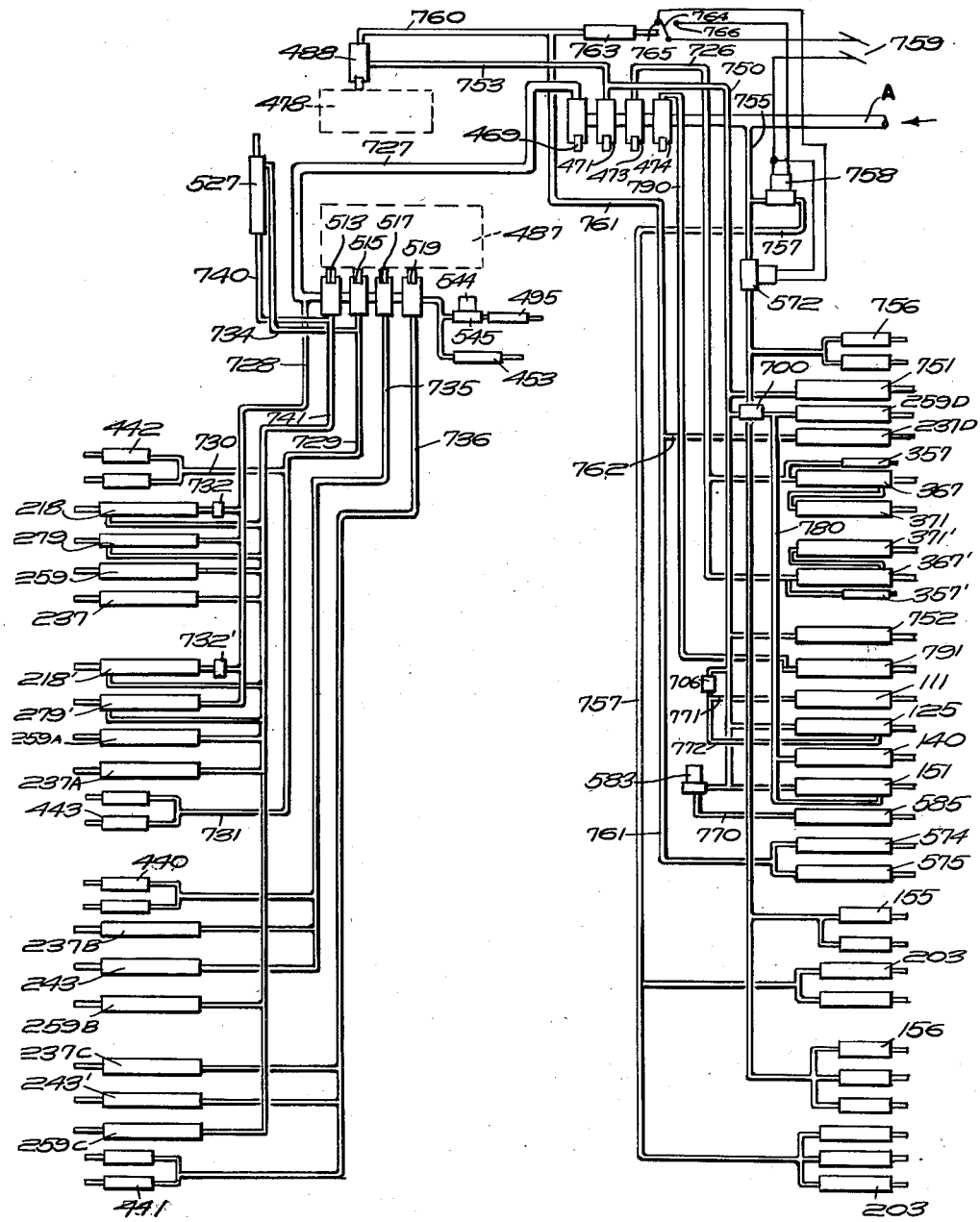

Figure 12-A is a section on line 12-A—12-A of Figure 12;

Figure 13 is a central sectional view through the parts shown in Figure 12;

Figure 14 is a top plan view of the showing in Figure 12;

Figure 15 is a section on line 15—15 of Figure 14;

Figure 16 is a top plan view of the actuated mechanism shown in Figure 15;

Figures 17 and 18 are plan and perspective fragmental views illustrating the operation of the mechanism shown in Figures 15 and 16;

Figures 19 and 20 are plan views of the upper and lower mechanism to illustrate a further position in the sequence of operation of the parts shown in Figures 17 and 18;

Figures 21 and 22 are plan and perspective views which show a still further operation in the sequence of operation of the mechanism there shown;

Figures 23 and 24 are views similar to Figures 19 and 20 to show a still further sequence of these operations;

Figure 25 is a side view illustrating the operation of the carriage shown in Figure 12;

Figure 26 is a sectional view showing the locking mechanism for the gripping member for the legs or wings of a bird;

Figure 27 is an end view of the carriage mechanism shown in Figure 25;

Figure 28 is a plan view of the rotating table for the neck plucking unit shown by itself;

Figure 29 is a sectional view on line 29—29 of Figure 28;

Figure 30 is a diagrammatic view illustrating the operation of the neck plucking unit at one point in the operation thereof;

Figure 31 is an edge view illustrating the neck plucking unit at another step in its operation;

Figure 32 is a diagrammatic view similar to Figure 30 but showing the neck plucking unit in a still different position of operation;

Figure 33 is an edge view similar to Figure 31 but showing the unit in a still further position of operation;

Figure 34 is a plan view of the rotating table for carrying the body plucking units;

Figure 35 is a section on line 35—35 of Figure 34;

Figure 36 is a fragmental plan view illustrating one position in the operation of the body plucking unit shown in Figures 34 and 35;

Figure 37 is a view similar to Figure 36 another position in the operation of the body plucking unit;

Figure 38 is a perspective view illustrating the stop mechanism of the body plucking unit;

Figure 39 is a perspective view showing a trip mechanism for the oscillation of the unit shown in Figure 34;

Figure 40 is a perspective view showing a still smaller fragmental part of the structure of Figure 39;

Figure 41 is a perspective view showing the carriage for the pluckers which moves in and out radially of the structure shown in Figure 34;

Figure 42 is a plan view of a fragmental portion showing the piston which operates the carriage and the spring which returns it;

Figure 43 is a perspective view of the quilling unit as shown in dotted lines in the forward position thereof;

Figure 44 is a front view of the quilling unit showing the working mechanism thereof;

Figure 45 is a diagrammatic view illustrating the collecting system for the waste or feathers from the bird;

Figure 46 is a diagrammatic view of the electrical circuit which controls the reversing mechanism for the pluckers;

Figure 47 is a fragmental plan view illustrating a pair of plucking units and a control for them;

Figure 48 is a perspective view of a fragmental detail of the plucker;

Figure 49 is a diagrammatic view illustrating the circuit which is controlled by the electrical switches of each plucking unit;

Figure 50 is a diagrammatic view illustrating the electrical circuit which controls the air for the middle section of the machine;

Figure 51 is a perspective view of a fragmental portion of the support for the tail plucker;

Figure 52 is a perspective view illustrating one of the end units for gripping a leg of the bird;

Figure 53 is a perspective view illustrating a gripper for the wings of the bird;

Figure 54 is a diagrammatic view illustrating the electrical and pneumatic control for the table which mounts the plucking units for the neck of the bird;

Figure 55 is a perspective view of a portion of the drive mechanism for the control of the machine;

Figure 56 is a perspective view of a fragmental portion of the mechanism of Figure 55;

Figure 57 is an elevation showing the supplemental power supply for one of the control drums;

Figure 58 is an elevation of a fragmental portion showing the middle operating portion;

Figure 59 is a section on line 59—59 of Figure 58;

Figure 60 is an elevation of a detail of the operating mechanism;

Figure 61 is a perspective view of another fragmental portion of Figure 55;

Figure 62 is a perspective view with parts broken away of one of the pluckers;

Figure 63 is an end view of a portion of the plucker;

Figure 64 is an elevation of a detail of the plucker;

Figure 65 is an elevation of the leaf spring of the plucker with some of its associated parts;

Figure 66 is a perspective view of one of the jaws;

Figure 67 is a top plan view of the leaf spring and some of its associated parts;

Figure 68 is a diagrammatic view of the air system for operating the machine;

Figure 69 is a sectional view showing a fragmental portion of the alternative plucking unit;

Figure 70 is an elevation showing another fragmental portion of the same alternative construction as shown in Figure 69;

Figure 71 is a sectional view showing the alternative plucking unit of which Figures 69 and 70 are details;

Figure 72 is a sectional view showing a still further detail of the alternative mechanism shown in Figure 71;

Figure 73 is a detailed view showing a further alternative construction to that shown in Figure 69 in the unit shown in Figure 71;

Figures 74 and 75 are sectional views illustrating other modified forms of pluckers; and Figure 76 is a perspective view of a modified form showing drum for gripping the feathers.

In proceeding with this invention I provide a frame upon which my mechanism is mounted. The bird is manually placed in position so that it is gripped by the neck, tail, each wing, and each leg, then by throwing a switch operation on the bird is commenced and is completed automatically when the bird is then taken from the machine.

Generally speaking, pluckers operate upon each of the limbs of the bird, the tail, the neck, and the body in a certain predetermined sequence, the pluckers operating in a plurality of paths on each rotating about the portions of the bird upon which it operates, all without further manual control. Arrangements are also provided for, so that should some protuberance exist upon the bird, the pluckers will operate over or about this protuberance without injury to the bird. As the feathers are removed from the bird, they are collected and passed through tubes to a common repository where they may be collected. A large part of the description deals with the manipulation of the pluckers to cause them to cover the surface of the bird.

Figure 1:
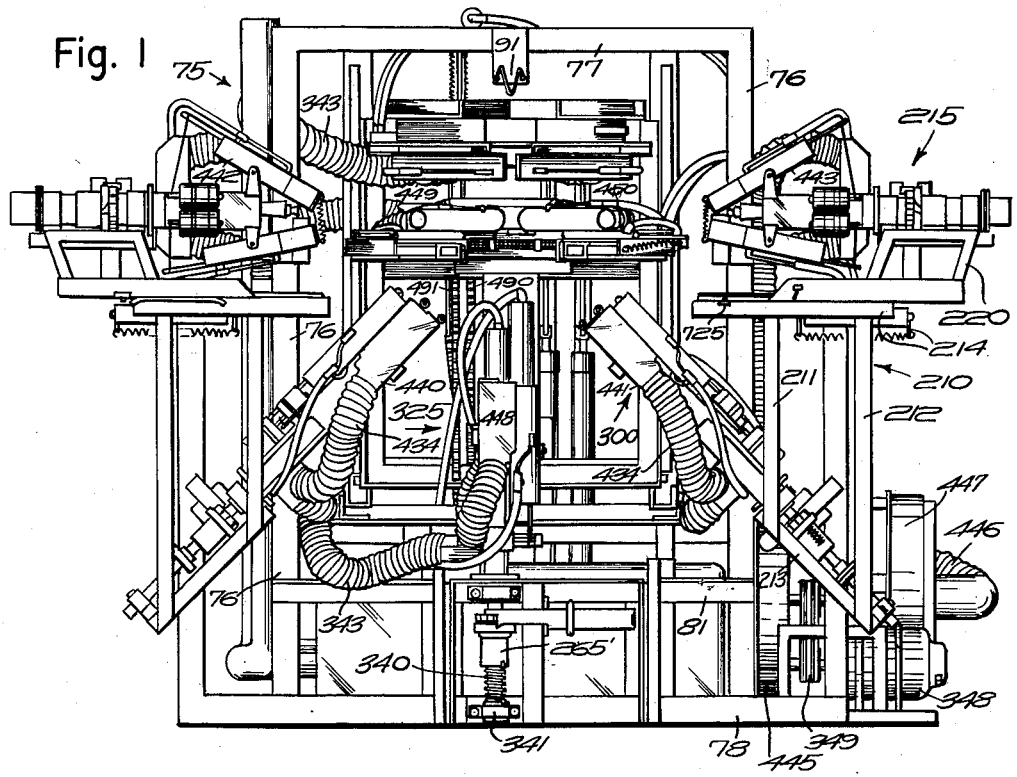
Figure 1 is a front elevation of the plucking machine showing the invention herein.

The supporting structure comprises a framework designated generally 75 comprising upright supports 76 (Fig. 1) which are connected together by cross members 77 at their upper ends and 78 at their lower ends, while there are frames 79 (Fig. 2) at the upper end and similar frames at the bottom to provide a support for the mechanism which is to be described. On the forward portion of the frame on a bracket 90 there is provided a hook 91 upon which the bird is supported by means of the neck of the bird being placed into this hook 91. The other portions of the bird are attached to holding parts which will be hereinafter described.

Body and neck plucking

An angle iron 81 (Fig. 1) parallel to the cross member 78 extends across between the uprights 76 and is joined by angle irons 82 (Fig. 3) which provide a track for the carriage designated generally 83, which carries the body and neck plucker for the bird. This carriage 83 comprises uprights 84 and 85 connected at their lower ends as at 86 and at their upper ends as at 87, the whole being mounted by means of rollers 88 at its lower end, and 89 at its upper end for movement along the tracks 82 to and from the bird which is supported by the framework.

The carriage 83 is provided with a pair of forwardly protruding angle irons 95, as seen in Figures 3 and 4, which support beneath them the mutilated annulus 96 having an opening through which the bird may pass (see also Figures 28 and 29, etc. for further details). The annulus, as shown in Figure 29 in section, comprises an inverted U-shaped piece 97 which is attached to a plate 98, the U-shaped piece 97 being fixed to the under side of the arm 95. Mounted upon and suspended by means of roller bearings 99, there is the channel-shaped mutilated annulus 100, the rollers 99 being positioned to extend over the upper and outer edges of the plate as shown in Figure 28; this permits of this annulus 100 moving about a center within itself in horizontal azimuth and carrying with it plucking units and other manipulating mechanism. The bars 95 are mounted on a plate 95' (Fig. 3) which plate is provided with roller bearings 96' for vertical movement within the carriage 83. This vertical movement occurs by reason of the cylinders 574 and 575 actuated by compressed air which will later be described The circular table 100 is provided with a plurality of outward projections 105, each of which provides an abutment surface 106, which abutments serve as a point for engagement by a pawl 107' to prevent reverse motion. This table is actuated circularly counterclockwise, as shown in Figure 28 by pressure on these abutments. A slide 107 guided as at 108 is moved by means of the piston rod 109 which is secured thereto as at 110 and actuated by the air cylinder 111 to move the table counter-clockwise as seen in Fig. 28 while a spring 112 serves to return the piston rod 109 and its slide 107 to initial starting position. The amount of movement is substantially the distance between two abutments 105 and movement in the opposite direction is prevented by the pawl 107'. The cylinder 111 is pivoted as at 113 to the bar 95 and its compression spring 114 serves to rock this cylinder so that the slide 107 will be moved into engagement with the table projection 105. The pawl 107' is pivoted at 115 and is swung by means of spring 116 so as to engage the abutment 106. Spring 117 also presses upon the pawl 107' urging it against rider 118, as shown more clearly in Figure 31.

Rotary motion counter-clockwise of the table is retarded and controlled through the flexible element 120 (Fig. 29) which is secured to the rotary table and extends over guide pulley 121, suspension pulley 122, and is secured at 123 to the frame. Pulley 122 is secured at the upper end of the piston rod 124 protruding from the cylinder 125, which has the air connections 750 and 772 thereto. Through the actuation of this cylinder 125, the table may be given a clockwise direction of rotation to return it to starting position. A stop comprising an abutment 128 is secured to the fixed table 96; while an L-shaped stop 129 is secured to the rotary table to engage therewith when the table is moved in a clockwise direction so that the opening through the tables will register when their initial position has been reached.

The plate 95' is also provided with a pair of angle iron arms 130, as shown in Figure 3 (see also Figure 35) which support the mutilated annulus 131 which is secured upon a plate 132. Superimposed upon this plate there is the circular table shown in inverted channel shape at 133 mounted by means of a plurality of roller bearings 134 so that this table may rotate about its center in a manner similar to that above described in connection with table 100. A rider 135 comprising a guiding surface is secured on the outside edge of the table 133, which extends a portion of the arc of the table, as shown in the plan views in Figures 34 and 37. This table is also provided with a plurality of projections 136 presenting abutment surfaces 137 to be engaged in rotating the table counter-clockwise. Rotary motion counter-clockwise of the table occurs by means of the slide 138 guided as at 139 along the side of a cylinder 140 which is used for actuating a piston rod 141 which is secured to the slide by means of the yoke 142 and which is returned by means of spring 143 to its initial starting position. This cylinder is pivoted as at 144 to the under side of arm 130 and upon which the table is mounted. A pawl 145 is pivoted as at 146 so as to move in back of the projection 136 to engage the abutment 137 so as to prevent clockwise movement of the table. A spring 147 serves to swing the pawl against the table, while a spring 148 urges the pawl against rider 135 in the same manner as the spring 117 acts on the pawl 107', as above described. In order to return the circular table 133 flexible cord 149 is provided which acts in the same manner as the cord 120 to be controlled by pulley 150 (Fig. 3) at the upper end of the piston rod extending from air cylinder 151. The return or clockwise motion occurs until the member 152 (Fig. 34) carried by the movable table engages the abutment 153 to limit the motion to the starting position.

In Figure 5 is shown the detail of a valve 700 shown also as to its location in the machine in Figure 3. This valve is cam operated by cam 701 which engages an arm 702 as it descends and rides on the surface 701, so as to force this arm inwardly to close the valve. On the upward movement, however, it is desired that the valve shall not operate and, accordingly, the arm 702 is permitted to swing downwardly about a pivot, but in order that it will be actuated when the cylinder 700 descends, a second arm 703 is pivoted as at 704 and engages the arm 702 to prevent it from swinging upwardly. A spring 705 serves to maintain the arms in substantially the position shown in Figure 5, while allowing them the relative movement just above described; thus, the arms pass over the cam 701 on their upward stroke, but are actuated by the cam on the downward stroke.

This air valve 700 serves to control the pluckers on the waist unit. Another valve 706 to similarly control the pluckers on the neck unit is provided, as shown in Figure 3, only in this case the plunger or arm 702 has a straight in and out movement over the cam surface 707 both on its upward and downward movements.

Further plucker manipulating mechanisms are carried below the circular table 100 for the neck, as shown generally at 155 in Figure 29, there being two of such mechanisms 155 as shown in Figure 28. In the circular table for the body portion of the bird, the plucker manipulating mechanisms 156 are carried above the circular table 133 and as shown in Figure 34, there are three of such mechanisms designated 156a, 156b and 156c. The manipulating mechanisms as shown in Figure 41 each comprise an inwardly extending guide member 195 which is pivoted to the table 133 such as on pins 157, 158, or 159 (Figs. 36, 37) and which member has oppositely disposed channels 196 and 197. A carriage 199 (Figs. 41, 42) has rollers 200 between the horizontal upper and lower surfaces of the channel 196 or 197, while it is provided with rollers 201 on a vertical bearing to engage the bottom of the channel 196 or 197. The pluckers are fixed upon this carriage 199 for radial movement by operation of the carriage 199, which radial movement may be either inwardly or outwardly. Movement of the carriage inwardly is by means of the piston rod 202 operated by the cylinder 203 and attached to the carriage by yoke 204 for movement inwardly, while the spring 205 serves to move the carriage outwardly when no pneumatic pressure is provided in the cylinder. In Figure 42, the carriage is shown at its innermost position to which it is moved by the spring 205. When air enters the cylinder 203 the carriage 199 is moved outwardly or to the left, as shown in Figure 42, against the tension of the spring, and when the air pressure is relieved, then the spring will draw the carriage inwardly again to the innermost position shown in full lines in Figure 42. The two mechanisms 156a and 156b which are mounted on the pivots 157 and 158 are connected together by an arcuate member 160 as at 161 and 162 which extends circularly about the table 133. Thus, movement of this member 160 will serve to oscillate both of these mechanisms together. An arm 163 (see also Fig. 39) is fixed to the table 133, and extends radially outwardly from the table 133. At the outer end of this arm 163, I have mounted in pivot 165 a link shown in perspective by itself at 164 in Figure 40, this link 140 being also secured by pin or pivot pin 166 to the member 160. This link 164 is provided with an arm 167 which extends outwardly therefrom, the same being pivoted on the link 164 by pin 168. The spring 169 holds the arm 167 against the back 170 of the channel-shaped link 164. This arm 167 is at such position that it will strike the shifter member 171 (Fig. 37) as the table rotates and will swing the link about its pivot 165 to cause the bar 160 to move circularly of the table and shift the two mechanisms 156a, 156b which are pivoted on the pivots 157 and 158. Movement of the bar 160 to return position is caused by the spring 173 when the arm 167 has passed the shifter member 171 and the spring 169 permits the arm 167 to swing in the opposite direction in order that the table may be moved past the shifter member 171 on its return movement.

The mechanism 156c which is mounted on the pivot 159, as shown more particularly in Figure 36, is rocked through a different mechanism, although carried by the same table 133. A bracket 175 is secured to the lower portion of the plate 132, as shown in Figure 35, and extends downwardly and radially inwardly to a position beyond the table 133. As shown in Figure 38, a block 176 is pivoted at 177 on this bracket 175 and is swung about this pivot 177 by spring 178 to engage a stop 179 to hold the block in one position on the bracket. This block 176 has an inclined surface 179 and an abutment surface 180 which serves to engage the hinge 181 which has the part 182 thereof fixed to the rotatable table 133. The member 181 of this hinge has a sprocket chain 183 fastened to it at a given point. A second lock or stop 184 (see Figure 36) is provided which is in all detail the same as stop 176. The chain 183 extends arcuately along the inner surface of the table 133, being held in position by sprockets 185 and 186 secured upon suitable brackets to the table 133. The opposite end of the chain 183 is connected to a link 187 which is pivoted as at 188 and has a slot and pin connection 189 to the mechanism 156 which is pivoted at 159. Thus, as the portion 181 of the hinge is engaged by the block 176 or the block 184, the chain will be given a movement relative to the table in the direction of arrow 189 so as to swing the mechanism 156 about its pivot 159 to the dotted line position shown in Figure 36. In view of there being two of such blocks 184 and 176, the mechanism will be given two such movements as the table rotates. It will be apparent that when the table reverses its movement that the inclined surface 179 of each of these stops 184 and 176 will permit the hinge 181 to ride over these stops by swinging the stop about its pivot against the action of the spring such as 178. The mechanism 156c is swung from the dotted line position to the full line position about its pivot 159 by a spring 190, this mechanism being guided by a pin 191 on the guide 195 moving in slot 192. The pluckers to be described in greater detail are mounted on carriages 199.

*Wing plucking*

The support and manipulation for the wing pluckers comprises generally a standard 210 (Figure 1) which is secured on the upright 75, this standard comprising uprights 211 and 212 at the lower end of which are the inclined members 213, while at the upper end horizontal members 214 are shown in spaced relation, as seen in Figure 2, to provide a track or guideway for a reciprocable unit 215 (see Figs. 1, 2, 25, 27) which may be guided in and out on these tracks 214. This unit 215 is moved forwardly by the piston rod 216 (Fig. 25) which is connected to it by yoke 217, the same being actuated by the compressed air cylinder 218 for forward or inward movement to the left, as shown in Figure 25, while the outward movement of the unit is caused by spring 219 when the air pressure is relieved from the cylinder 218.

The carriage 215 has upright arms 220 (which support pillow blocks 221 and 222 (Figs. 12, 13) in which is rotatably mounted the outer portion 223 of the tubing) in which the forward pushing head 224 telescopes. The forward portion of the tubing 223 is rectangular in cross section as seen at 225 (Fig. 12-A) the same being welded or secured against rotation to the circular portion of the tubing 223. The head 224 comprises spaced plates 226 and 227 (see Fig. 12-A) which are flanged inwardly at their ends at 228 and 229 (Fig. 13) and secured to the cylindrical tube 230 which telescopes into the tube 223 at its other end. Forward movement of the head 224 is accomplished by piston rod 231. Rod 231 is secured to a rod 232 by the yoke 233 (Fig. 12) which rod in turn is bifurcated (Fig. 14) and receives in the bifurcation 234 the flange 235 provided on the head 224. The rod 232 is guided between plates 244 and 245 which are fastened to the frame 220 and has the flexible cable 238 attached to it as at 245 (Fig. 14). Air cylinder 237 which is secured to the frame 220 serves to actuate this piston rod 231 for movement of the head to retract the head 224, while flexible member 238 guided as at 239, 240 and 241 serves to pull the head forwardly. In some cases an auxiliary unit 242 is provided to move inwardly the pulley 240 to draw in one plucking mechanism ahead of the others, by means of air pressure in cylinder 243 which forces the pulley 240 inwardly.

Rotary movement is imparted to the tube 223 by there being fixed upon the tube a ratchet wheel 250 (see Figures 12 and 15), there being a pawl 251 pivoted at 252 and having its forward end shaped as shown at 253 (see Figures 2 and 17) to engage any one of the teeth of the ratchet wheel 250. This pawl is drawn downwardly into engagement with the ratchet wheel 250 by means of a spring 254 and the pawl is guided in its movement between upstanding members 255 and 256. Movement is imparted to the ratchet wheel through a swinging member 257 pivoted as at 258 and forced upwardly through air cylinder 259 and its piston rod 260. As the end of this member 257 will be at varying distances from the ratchet wheel through its swinging movement and as contact with the ratchet wheel is necessary for imparting a movement thereto, this varying distance is compensated for by a slide 261 (Figs. 15, 16) movable in the guide provided by the inturned edges 283 of the member 257 and which is moved lengthwise to extend the length of member 257 by means of spring 262 until lateral extension 282 engages the edges 283 for engagement with the ratchet teeth but which may slide to shorten the length thereof to compensate for varying distances between the hinge pivot 258 and the ratchet wheel at the point of engagement of the member 257 therewith. In order to retract the member 257 or maintain it in engagement with its actuating plunger 260, I have provided a spring 263.

A tube 265 (Figs. 12, 14) provided with a flange 266 is rotatably and slidably mounted upon the tube 223 and is locked against rotation by means of a pin 267 (Fig. 14) extending through flange 266 into a hole 268 (Fig. 15) in the ratchet 250. Pin 267 is fixed in the ratchet, while a spring 269 engages the flange 266 and acts between this flange and a head 270 on the pin to force the sleeve 265 and its head 266 against the ratchet 250 although allowing axial movement of the sleeve. The edge of flange 266 is provided with a recess 271 (Figs. 12, 17) having a cam surface 272 on one edge thereof. This recess is of a shape to receive the projecting portion 273 of the pawl 251, as shown more particularly in Figures 17, 19 and 23. As the ratchet is rotated carrying with it the sleeve 265, this projecting portion 273 of the dog 251 engages the cam surface 272 to force the sleeve 265 from the position shown in Figure 17 to the position shown in Figure 19; thus, the end or point of the projection 273 will ride along the surface 274 while engaging in the teeth of the ratchet throughout a predetermined number of actuations by the cylinder 259. At a predetermined point a projection 275 secured to the ratchet 250 is provided to extend beneath the arm 276 of the dog 271 so as to lift this dog that its projection 273 may again ride on the upper outer surface of the flange 266, as shown in Figure 21. When this dog is thus raised from the ratchet teeth, the cylinder 223 upon which the ratchet is mounted is free to be returned to its initial or starting position which occurs through drum 277 (Fig. 12) and flexible element 278 which is wrapped around this drum, the same element 278 being actuated by air cylinder 279, which is operated in a predetermined timed relation through a cam mechanism to be described.

In order for the reverse movement of the sleeve 223 to occur, it is necessary that the actuating member be withdrawn from engagement with the ratchet. In Figure 15 I have shown member 257 which is pivoted as at 258 drawn down by spring 263 sufficient to have extension 261 clear the teeth of the ratchet wheel. It will be apparent that the motion of the dog and its actuating member are occurring at the same time and for convenience like positions of these two parts are shown in the grouped Figures 17 and 18, 19 and 20, 21 and 22, 23 and 24.

Centrally located in the tubular member 230 and the tube 223 there is a guide tube 285 (Fig. 13) which is fixed to the closure 286 at the end of tube 223. The opposite end of this guide tube 285 is provided with a block 287 slidably mounted in the tube 230, so that as the tube 230 moves outwardly or to the left as shown in Figure 13, the tube 285 will remain relatively stationary. Within the guide tube 285 there is a tube 288 having a pair of grippers 289 secured to this tube 288 which may engage the wing of the bird. A spring 290 is attached to the end of the tube 288 to which the grippers 289 are anchored by means of the flexible element 291, while the other end of the spring is anchored by means of the wire or flexible element 292 to the end 293 of the guide tube. Thus, the arrangement is such that a spring tension will be maintained upon the grippers pulling them lengthwise of the unit shown in Figure 13 at all times regardless of the relative longitudinal positions of the head 224 and the tube 223.

Referring to Figure 26, a set screw 295 extends through the wall of tube 285 into a position where it may engage the sliding tube 288. Upon this rotatable screw 295 there is fixed the lever 296 which may be engaged by the lug 297 fixed on the tube 230 when the tube is moved to the right as shown in Figures 13 and 26 so as to engage the lever and rotate the screw clockwise. While, when the stop 297 moves to the left, as shown in Figures 13 and 26 the lever 296 will be free to be moved by the spring 298 counterclockwise. The screw provided in this instance is a left-hand screw so that the counterclockwise movement caused by the spring 298 will draw it firmly into engagement with the tube 288 and cause it to lock the tube 288 to the tube 285. By this arrangement the bird is held against action by the pluckers after engaged but yet by release of this locking mechanism, there is an opportunity for a readjustment of position for the next succeeding bird or for the same bird in the next operation. The pluckers for the wings are mounted on the head 224 by being pivoted at 299 (Fig. 14).

*Leg pluckers*

In order to operate upon the legs of the bird, I have provided manipulating mechanisms 300 (Fig. 1) which are mounted on the inclined fixed supports 213 and extends upwardly at an angle of substantially forty-five degrees. These units are similar to the units 215 above described except that it is unnecessary to provide a carriage such as moves upon the tracks 214 of the units 215. The telescopic mounting described in greater detail above and shown in Figure 13 provides for all of the movement of the pluckers in these units 300. However, as these units move upwardly, some additional power is required for lifting these units and to supply this power I have provided cylinders 237–A and 237–b hidden in the various views but shown diagrammatically in Figure 68.

*Tail unit*

A tail unit designated 325 (Fig. 1) is provided in a vertical position and is similar to the leg units 300. This unit is also provided with a spring 340 to assist in maintaining the weight of this unit which is vertical in position. This spring also serves as a cushioning means or buffer when the unit descends. As shown in Figure 51 the spring 340 has its ends 340a and 340e locked so that as the portion 265' of the tail mechanism is rotated, it serves to wind up the spring 340 so that when release occurs, the torsional stress placed in the spring by rotating the part 265' will cause a reverse rotary movement of the part 265' to starting postion, due to the fact that the end 340e is locked in a block 341 on frame 78.

*Quilling mechanism*

Additional operating mechanism which I shall call a quilling mechanism is designated generally 350, as shown in Figure 2 and as shown in greater detail in Figure 43. This mechanism is timed to operate after the wing plucking mechanisms operate and comprises a base 351 upon which a pair of rollers 352 and 353 are mounted which contact the bird and pull feathers from the body by means of the nip of the rolls on the feathers. The roller 352 is fixed upon a shaft 354 having bearings as at 355 and 356, (Fig. 44) and is driven by an air motor 357 through bevel gears designated collectively 358. The roll 353 is secured to a shaft 359 which is mounted in slidable blocks 360 and 361 at either end thereof forced downwardly by springs 362 and 363. Pinion gear 364 on shaft 354 drives the pinion gear 365 on the shaft 359 so that rotation is imparted from one roll to the other that they may rotate in time with each other. This quilling unit base 351 is mounted on the end of a square piston rod 366 (Fig. 43) which is actuated by air cylinder 367. This air cylinder 367 is pivoted as at 368 on a bracket 369 which is fastened to the frame. A spring 370 serves to move the base 351 and the piston rod 366 inwardly of the air cylinder 367. A second air cylinder 371 is pivoted as at 372 on a framework at 373 of the machine and has a piston rod 374 which is secured by a pivot 375 to the air cylinder 367. This cylinder is actuated by the air which passes into the cylinder 367 when the piston thereof uncovers a port to allow the air to pass through the flexible hose 376 into the pivoted end of the cylinder 371. This piston rod is retracted by the spring 377 after the air pressure has ceased. It will thus be apparent that initially the base 351 is forced outwardly longitudinally of the cylinder 367 and then the cylinder 367 will be swung about its pivot 368 to approach the bird the movement being in an arc such as represented in dotted lines in Figure 43.

*Plucking unit*

The pluckers shown in Figures 8 to 11 and 62 to 67 are manipulated by the mechanism above described. They may take different forms. One form comprises essentially a casing 375 (Fig. 9) having a compartment 376 for the plucking mechanism and a compartment 377 for an air motor 378 which consists essentially of a cylinder 379 and a plunger 380 which is reciprocated by air supplied by conduit 381 conveyed through connection 382 to the forward portion and 383 to the rear portion. The plunger 380 has a head 384 with a pin 385 (see also Figures 65 and 67) which operates through a slot 386 in partition 387 of the casing.

The operating plucking mechanism in compartment 376 of the casing on the other side of partition 387 comprises a reciprocating plate 388 (Fig. 62) having an upstanding wall 389 extending from one edge of the plate to engage the outer wall 390 (Fig. 9) of the casing and a wall 391 (Figs. 9 and 62) spaced therefrom intermediate of the opposite edges of the plate. A bearing 392 (Fig. 63) is secured to the surface of plate 391 and through this bearing and to a bearing in wall 389 there extends a shaft 393 upon which jaw 394 is secured, while the cam following member 395 is secured on the end of the shaft 393 and the other side of bearing 392. This jaw 394 is shaped as shown in perspective in Figure 66 which is generally arcuate with ears 396 and 397, fixedly mounted on the shaft 393, leaving the opening 399 so as to allow passage of air and feathers therethrough. A rubber face 400 is provided on the gripping edge of the jaw for engagement with the feathers, as will later be pointed out.

The cam follower 395 has a pin 402 (Fig. 63) extending through it and projecting beyond it to serve as a means for engaging abutments or cam surfaces which are to cause the actuation of jaw 394. This pin also serves to hold in recess 403 (Fig. 63) the end 404 (Figs. 62, 64) of the extendable rod 405 comprising the outer telescopic member 406 and the inner telescopic member 407, which rod is caused to elongate when free to do so by a spring 408 (Fig. 11) engaging the flange 409 on the member 406, while its other end engages the end 410 of the plate 388 (see Figure 11 or 62); thus this spring will serve to swing the jaw 394 to contact the jaw 401 whenever it is free to do so. The control for the jaw is through a plate 411 (Fig. 67) which is mounted upon a leaf spring 412 (see Figures 9 and 65), which leaf spring is secured to the wall 387 of the casing by screws 413. This plate 411 thus is free to rock toward or from the wall 387 by this spring hinge mounting. An arm 414 (Figs. 9 and 67) pivoted at 415 and urged by spring 416 also presses against this plate 411. Pivot 415 is located in the flange 417 which is secured to the inner wall 391. A block 418 is attached to the plate 388 and is provided with pin 385 and an upstanding follower 419, as shown in Figures 65 and 67. This follower 419 is beveled at its opposite ends as at 420 and 421. Recesses 422 and 423 are provided in the plate 411 through which the follower 419 may pass, while intermediate these recesses there is a portion 424 with which the cam follower may engage. The plate 411 is also provided with a protuberance or thickened portion 425 having an abutment surface 426 and a cam surface 427, the arrangement being such that as the air motor moves the plate 388 forwardly or to the left as shown in Figures 9 and 62, the cam follower 395 will engage the abutment 426 to swing the jaw 394 to open position, and as movement continues the follower 395 will pass beneath the abutment surface 426 and along the cam surface 427 (as shown by dotted lines Fig. 65) until it is free to be swung to closed position by the spring 408, thus this closing action will occur snapping the jaw against plate 388 as the plate is adjacent the forward end 428 (Fig. 9) of the casing 375. During the movement of the plate forwardly, the follower 419 will move on the side of the plate 411, as shown in Figure 65 or Figure 67, being guided through recess 422 by the bevel 421 on follower 419 and bevel 429 on the edge of the portion 424, as shown in Figure 67. However, after the forward movement is completed and the plate moves rearwardly, the follower 419 will pass through the recess 423 and by reason of its beveled edge 420 on follower 419 engaging the beveled edge 430 of the portion 424 of the plate, will move along the opposite surface of the plate as shown in dotted lines at 431 in Figure 67 to so swing the plate 411 about its hinge spring connection 412 that the cam surface or thickened portion 425 will be moved free from the projection 402 which will ride along the inner surface of this thickened portion 425 to move it out of connection with the pin 402. The follower 419 is assisted in its movement through the recess 423 by the spring-pressed arm 414.

At the forward end of the casing 375 combs 432 which may be selected as to teeth spacing so that various sizes of feathers or hair may be operated upon, some parts of the bird requiring operation upon smaller hairs or feathers and other parts of the bird. The plucking units all have a suction opening 433 (Fig. 9) at one end of the casing 375 to which a hose 434 (Fig. 7) is attached, which hose leads to common conduits and thence to a suction device and out by means of conduit 436 into a suitable repository.

This exhausting or conveying of feathers is shown diagrammatically (Fig. 45) in which the leg and wing pluckers are represented, in which the leg pluckers are designated 440 and 441 on the one hand and the wing pluckers are designated 442 and 443 on the other hand, these all being connected to a common conduit 444 extending to a first exhauster 445 and then through conduit 446 to a second exhauster 447 and thence to the repository through conduit 436. Other plucker units are designated as 448 for the tail, 449 for the neck, and 450 for the body or waist. These pluckers are attached through a common conveyor 343 to the same two exhausters 445 and 447, as previously described. A gate valve 344 automatically and mechanically operated as at 345 serves to place in connection with the exhausters either conduit 343 or 444 depending upon which of the pluckers are operating. This control comprises a piston rod 346 moved by the cylinder 345 forwardly and returned by the spring 347 to the position shown in full lines. It will be necessary for air pressure to be supplied during the time that the gate 344 is across the conduit 343. The exhausters are operated by a suitable electric motor 348 operating through V-belts 349 on the pulleys for driving the exhausters.

*Control mechanism*

Figure 6:
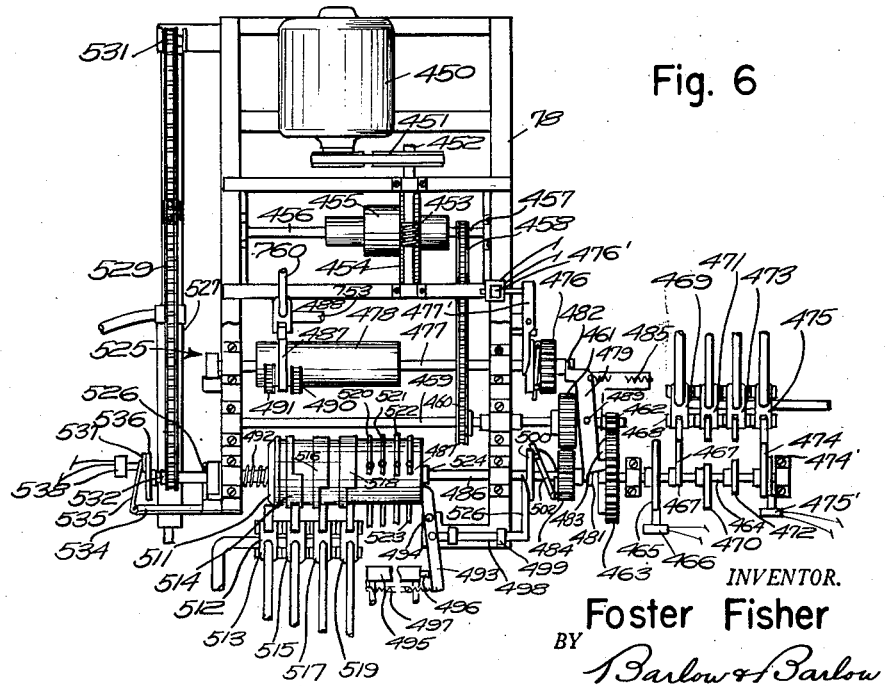
Figure 6 is a diagrammatic view illustrating the control mechanism for the machine.

In Figure 6 I have illustrated a control mechanism mounted on the framework at the lower portion of the machine, which framework is designated 78. A motor designated 450, which is started by a switch when a bird is ready to be plucked, through V-belt 451 drives shaft 452 having a worm 453 thereon, which in turn drives worm gear 454 which through clutch 455 drives shaft 456 on which there is sprocket 457 to drive sprocket chain 458, and in turn drive shaft 459 through sprocket 460, there being driven gears 461 and 462 on the shaft 459. Gear 462 drives gear 463 on shaft 464 which has a plurality of cams for various controls. Cam 465 operates switch 466, which switch 466 controls the entire electrical mechanism and remains connected through one cycle of the cam 465 or one complete operation of the plucking device when the switch is then opened. Various cams 467, 470, 472, 474 and 474' control various valves and cam 474' control a switch all in a predetermined timed relation for the manipulation of different pluckers as will be pointed out in the operation to be described.

Other controls are driven from the gear 461, there being a gear 476 on shaft 477 which engages the gear 461 and drives the drum 478. The drive of the gear 476 occurs when a rocker arm 479 pivoted at 480 is rocked about the pivot 480 by means of the cam surface 481 on the gear 463 so as to pull the gear 476 into mesh with the gear 461. This rocker arm 479 is provided with bifurcated portions 482 engaging a groove on the hub of gear 476 at one end, while it is provided with a bifurcated portion 483 engaging a groove on the hub of gear 484 at its other end, so as rocking of the lever occurs by reason of the cam surface 481 on the gear 463, either one gear or the other will be drawn into mesh with the gear 471. A spring 485 serves to maintain the rocker arm 479 in engagement with this cam surface. When the gear 484 is operating, the shaft 486 will be rotating to drive the drum 487.

The drum 487 is slidably mounted upon the shaft 486, being moved in one direction by spring 492 and moved in the other direction by the lever 493 pivoted as at 494. This lever 493 is moved about its pivot 494 by the air cylinder 495 and pistons 496 thereof in one direction, while it is moved in the other direction by spring 497. As this lever operates, it will slide the bar 498 through the slides 499 so as to move the reversing mechanism 500 which connects with gear 484, as will be more in detail described. The drum 487 carries a plurality of cams which operate as the drum is moved to the left, as shown in Figure 6. The first cam 511 operates the valve 512 for the control of the air in conduit 513 which actuates the cylinder to obtain rotatable motion of the wing and leg units, also the cylinder which pulls back the carriage of the wing units and also actuates the tension cylinder for the reverse motion and to the assisting cylinder for the reversing of the drum. The next cam 514 controls another function and so on as will presently appear.

As the drum 487 rotates, it also winds up the cables 520, 521, 522, and 523, which operate as follows: The cable 520 pulls in the left wing unit. Cable 521 pulls in the left leg unit. The next cable 522 pulls in the right leg unit; while the cable 523 pulls in the right wing unit. The block 524 is a square block mounted on the shaft 486 along which the drum slides while maintaining a rotary keyed relation with the shaft 486. The drum 478 is prevented from three hundred sixty degrees rotation by a stop mechanism 525, while a similar stop mechanism 526 is provided for the preventing of the drum 487 from making a three hundred sixty degree turn.

Cam 487 which is secured on drum 478 operates a valve 488 in turn controlling the air conduit 760 which controls other mechanism for the operation of the pluckers. The drum is also provided with a pair of sprocket chains or suitable flexible elements 490, 491, which wrap about the drum 478 so as to elevate the plate 95' which carries the body and neck plucking units.

In order to disengage the gear 484 from the shaft 486, disc 500 (Figs. 6, 55) fixed on shaft 486 is provided with a projecting pin 501 which is engaged by one edge member 502 hinged as at 503 to the gear 484 and provided with a slot 504 to straddle shaft 486 upon which the gear 484 and disc 500 are mounted. A leaf spring 505 which is secured at the hinge end of the member 502 acts between the member 502 and the gear 484 so as to urge the member 502 toward the disc 500. This arrangement above described serves to lock the gear 484 which is freely mounted upon the shaft 486 to the shaft through the disc 500 which is fixed on the shaft 486. An arm 506 (Figs. 6, 55) fixed to the end of rod 498 is positioned to extend over the upper edge of the disc 500, so as to engage the member 502 and lift it out of engagement with pin 501 so that this member 502 will ride on the end of the pin and permit rotation of member 502 and the gear 484 to which it is attached relative to disc 500 and shaft 486. Thus, the shaft 486 may reverse its rotation without transmitting a reverse rotation to the gear 484. Just before the drum 487 completes a rotation of three hundred sixty degrees, air cylinder 495 is actuated to disconnect gear 484 from disc 500; thus permitting the drum 487 to reverse its rotation and at the same time the lever 493 pivoted at 494 urges the drum to the left, as shown in Figure 6, against the action of spring 492 so as to cause the air valve 512 to be actuated and at the same time, cylinder 527 (see also Figure 57) is so timed that air is admitted to this cylinder to force piston rod 528 to the left and cause it to move the sprocket chain 529 which is connected therewith at 530. This sprocket chain is trained over the sprocket gears 531 and 532, the latter being on the end of drum shaft 486 so as to rotate the drum in a reverse direction to bring the drum 487 back to starting position, at which point the member 502 (Figs. 6, 55) will again swing through action of its spring 505 into a position to engage the pin 501 for a new cycle of operations.

A bracket 534 (Fig. 6) hingedly mounts an arm 535 which engages disc 536 also carried by the end of shaft 486 out beyond the sprocket 532. This disc 536 is provided with a cam surface 537 to cause arm 535 to ride up over this cam surface and actuate an electrical switch 538 for control of the plucking units about the neck and waist or body.

Referring to Figure 46, the electrical circuit which ties in with the drum 487 is illustrated. The pluckers for these wing units are designated 442 for the pluckers of one wing, and 443 for the pluckers of the other wing. Each of these pluckers 442 or 443 carries a switch 542, which switches are connected in parallel from a source of energy 543 to a solenoid 544, which when actuated opens the gate valve 545 in the air line 546 so as to supply air to the cylinder 495. These switches 542 are also in parallel with the switch 538, above described and shown in Figures 6 and 46, so that any one of these switches 542 or the switch 538 will cause the air valve 545 to operate. The switches 542 are actuated when the pluckers engage the body of the bird, or rather when the plunger 547 on the plucker strikes the body of the bird forcing the plunger to actuate the switch 542; thus these indicate automatically when each of these pluckers has reached the full inward extent of its movement. The switches and plunger 547 are on the outer surface of the wing pluckers. Should, however, the plungers 547 fail to operate prior to the drum making three hundred sixty degrees revolution, then the switch 538 will operate to cause a reverse rotation.

A further control for the pluckers is shown in detail in Figures 47 and 48. This control is provided on the pluckers which operate on the legs, wings, and tail. These pluckers are designated generally 550 and constitute in each unit a pair of pluckers pivotally mounted upon a base portion 551 as at 299, each of these pluckers is provided with a feeler member 552 which is mounted on the portion of the plucker which slides next to or contacts the wings, legs, or tail portions. This feeler 552 (Fig. 48) is slidably mounted on the plucker and urged forwardly by a spring 553 so that should the feeler engage a protuberance on the portion of the bird over which it operates, it will be slid rearwardly with reference to the plucker 550, and in sliding rearwardly it will engage an electrical switch 554, see also Figure 49 which shows a plurality of such switches 554 connected in parallel with a source of energy 555 so that should the circuit be closed by any one of these switches, a motor 556 which is in series with the switch 554 is actuated to swing the plucker 550 which is on carriage 220 so that as it moves it will cause the switch 558 to engage the rider 559 which is fixed to the track 214 so as to close this switch and actuate all of the motors 556 to cause the pluckers to swing about their pivots 299 to open position. Thus the pluckers are swung apart as they move inwardly toward the bird as shown in dotted lines in Fig. 47.

The motors 556 each has a shaft 560 about which a cord 561 may wrap so as to pull the arm 562 which is secured to the plucker, to swing the plucker around its pivot 299 to open position. When either one of the switches 554 or 558 is released and the motors 556 are de-energized, a spring such as 563 (see Figures 2, 8 and 47) will serve to swing the pluckers about their pivots 299 to return them to initial position.

A control is provided for the pluckers on the neck units, shown more fully in Figures 28 to 32, where beneath each of the pluckers 155 a switch 580 (Figs. 31, 54) is provided. Thus, should the pluckers 155 engage a protuberance, this switch 580 will be moved to close the circuit 581 energized as at 582 to actuate the solenoid 583 and open the air valve 584 so as to cause air to enter the cylinder 585 which stops the movement of carriage 95' downwardly until completion of the other strokes as this plucker has then hit the wings or shoulders of the bird.

In Figure 52 I have shown in greater detail the unit for gripping the leg. A conical member designated 600 is formed in halves 601 and 602 which are hinged together as at 603 and moved toward open position by a spring 604 about the hinge. Flanges 605 and 606 extend inwardly from the large end of the cone so as to engage the leg and hold it firmly when the cone is closed thereon. The two halves 601 and 602 are held in closed position by a latch 607 having a detent 608 to extend into a hole or opening 609 in the half 602. This latch may be disengaged by forcing the detent 608 inwardly by the finger for opening the unit. One of these halves 601 or 602 is secured to a metal cable 610 such as by brazing, this cable extending through a unit such as shown in Figure 13.

In Figure 53 I have illustrated a modification of the gripping unit 289, shown in Figure 13, wherein there is provided a U-shaped member 611 having a jaw 612 hinged as at 613 to one wall of the U and which is of an extent greater than the distance between the walls so as to engage the other wall 614 when at an angle thereto, there being a spring 615 tending to swing this jaw 612 against this wall or jaw 614 so that the wing may be held between these portions 612 and 614. Teeth 616 may be provided on this jaw 612, while teeth 617 may be provided at the end of the jaw 614. A cable is secured by rivet 619 to the member 611.

Referring to Figures 74 and 75 a modified form of plucker is shown, wherein there is a casing 625 having a shaft 626 rotatably mounted in support 627. A rubber roller 628 is fixed to shaft 626 and also fixed upon this shaft is a gear 629 which is driven through bevel gears 630 and 631 by rotary air motor 632 through air conduit 633. A rockable carriage 634 pivoted as at 635 is also mounted in this casing and carries a plate 636 provided with a comb edge 637. Beneath this plate a cleaning member 639 is mounted which is close to a steel roll 640 and which by reason of shaft 641 supports this roll, this roll being driven by a pinion 642 which meshes with the gear 629 on shaft 626 and is driven thereby. A compression spring 643 swings the carriage 634 about its pivot 635 so as to cause the steel roll to engage the rubber roll 628 and grip any feathers between these rolls to pull them from the bird. A stripping comb 644 secured in the casing 625 is mounted in close adjacency but spaced from the rubber roll 628 so as to strip any feathers which may tend to stick to the rubber roll therefrom, diverting them into the air conduit 645 through the casing.

With reference to Figures 69 to 73 I have shown a still different modified form of plucker wherein there is a casing 650 which mounts a shaft 651 in bearings, to which shaft there is secured a rubber roll 652 and a bevel gear 653 (Figure 70) driven by bevel gear 654 from the air motor 655 having an air conduit 656. Integral with the gear 653 is also a pinion gear 657 which in turn drives the pinion gear 658 also driving a sprocket gear 659 about which sprocket chain 660 is trained, to drive the sprocket gear 661 and in turn the drum 662 about which belt 663 extends and is driven. This belt 663 extends over the pulley 664 which is urged into engagement with the rubber roll 652 by having trunnions 665 (Fig. 72) mounted in the inclined slot 666 and urged upwardly by the springs 667 at either end of this pulley 664, so that a firm engagement is established between the belt 663 and the rubber roll 652. A comb 668 extends upwardly from the casing 650 to assist in directing the feathers, while a stripping comb 669 secured to the casing and in close adjacency to the rubber roll 652 serves to strip any feathers which may cling to the roll 652 and divert them into the air stream 670 extending through the plucker to the conduit to which the plucker is connected. In Figure 73 the belt 663 is shown as extending over a thin-edged member 670 which enables the flexible belt 663 to protrude further along the surface of the rubber roll 652 and come closer to the surface of the bird which is being plucked.

In Fig. 76 I have shown a drum 623' on which there is provided rubber section 675, one of which will contact the companion roll such as 641 to concentrate the pressure and gripping action on the feathers and more forceably pull the feathers from the bird. This drum is hollow and perforated as at 676 so that air may pass therethrough and draw feathers against the drum.

*Operation*

First, the exhausters 445 and 447 are started, then the compressor for the air at A, Figure 68 is started. The general sequence of operations is that the wing pluckers start to operate first; then before completion of the operation of the wing pluckers, the leg pluckers commence; and then the body, neck, and tail pluckers operate simultaneously upon the bird, all of which will be described in greater detail.

The bird is first located in the machine by attaching the neck in clamp 91, attaching the tail to the gripper 289 of unit 325, attaching the legs to the gripper 600 of the leg units 300, and attaching the wings to the gripper 289 of the units 215. A switch 725 (see Figure 1) is then thrown. The switch starts motor 450 (see Figure 6) which in turn operates the main drive shaft 459, as above described, and the auxiliary shaft 464. One of the first operations of the shaft 464 is that the cam 465 closes switch 466. The switches 725 and 466 are in parallel, the arrangement being such that all of the operations of the machine will be completed while the cam 465 is rotating one revolution, and at the time that the cam does rotate this revolution, then the switch 466 will be opened. At the time of starting by throwing switch 725, gear 476 (see Figure 6) is in engagement with gear 461 and gear 484 is out of engagement with gear 461. However, gear 476 is disconnected from the shaft 477 by reason of the position of the lever 477' which has been pushed outward at the lower end and inward at the upper end by the solenoid 476'. Thus, as the gear 461 starts to rotate, no motion has been transmitted to the shaft 477. Motion is transmitted to shaft 464 to turn the various cams thereon, and the first cam which is brought into operation is cam 472, which actuates valve 473 (see also Figure 68) which permits compressed air to pass through conduit 726 which, as shown in Figure 68, will control the right and left quiller motors and cylinders 357, 367, 371 on one side, and these corresponding units 357', 367', and 371' on the other side. These units are shown in greater detail and explained above in Figure 43. This operation of the quillers is permitted so long as the high spot on the cam 472 maintains valve 473 open. This valve then closes.

At the time of closing of valve 473, cam 483 is so arranged that lever 479 swings about its pivot 489 so as to throw gear 476 to the position shown in Figure 6 and the gear 484 into the position shown in Figure 6; that is, these gears are thrown from and to engagement with the gear 461 from the previous position to the position shown in Figure 6. At the time that this action of lever 479 occurs, the switch 475' is open so as to de-energize the solenoid 476'. When the air through wave 473 is shut off, the springs 370 and 377, as shown in Figure 43, operate to bring the quillers back to normal position.

The next order of operation is that cam 467 operates valve 469, which referring to Figure 68 permits air to enter conduit 727 supplying air to the valves 513, 515, 517, and 519, also furnishing air to cylinder 453 which, as shown in Figure 45, closes the gate 452 to direct the exhausting air through conduit 444. Valve 469 is maintained open to supply air and exhausting through conduit 444 so long as all of the pluckers which are actuated by the supply of this air are to be maintained in operation.

Branched from this main conduit 727 is also a conduit 728 which leads directly to cylinders 218 and 218' (see Figure 68 and Figure 25) to start the wing plucking mechanism 215 inwardly. This conduit 728 also supplies air to the cylinders 279 and 279' (see also Figure 12) to hold tension on the rotation of the plucking unit carrier 229, also shown in Figure 12.

As above described, shaft 486 is rotating which rotates the drum 487 which first through its cam 514 actuates valve 515 (see Figure 68) to permit air to enter conduit 729 and supply the pluckers on the right and left wing units through branches 730 and 731 which pluckers are designated 442 and 443. A branch line of air 734 also leads from this conduit 729 to the forward end of cylinder 527 (see Figures 68, 6, and 57) so that air entering the forward part of this cylinder 527 will actuate the sprocket chain 529 and sprocket gear 532 which is on shaft 486 to assist the operation of the drum which at this point needs more power as the cables wound about it start to operate. Thus, cables 520 and 523 draw in the wing units such as by cable 238 shown in Figure 14, while cables 521 and 522 start to draw up the leg units by an arrangement shown in Figure 14, the timing being varied by the cylinder 243 which varies the timing of the operation of the leg units from that of the wing units.

At the same time that the cables just above described are operating, valves 517 and 519 (see Figure 68) open to permit air to pass into conduits 735 and 736, which would serve to actuate the pluckers on the right leg unit 441 and also the assisting cylinder 237b in Figure 68 which is the same arrangement as cylinder 237 shown in Figure 12. This conduit 735 also actuates cylinder 243 which as shown in Figure 14 is for adjusting the slack or timing of the cable 238 in this instance for the actuation of the right leg plucking unit.

The conduit 736 in a similar manner actuates the pluckers 441 on the left leg unit and the assisting cylinder 237c and cylinder 243' which takes up the slack or adjusts the timing of the cable 238, as shown in Figure 14. The timing of the air as it enters conduit 736 is so that it will start operation just after air is caused to enter conduit 735.

It will be seen that as the pluckers of the wing and leg units are advancing inwardly, they are operating and opening and closing to follow the protuberances on the bird as explained in connection with Figures 48 and 49. When the switch such as 542 contacts the body of the bird as explained in connection with Figure 46, the electrical unit 544 serves to open valve 545 (see now Figure 68) to actuate cylinder 495 (see Figures 46 and 68) so as to reverse the operation of the drum 487. The reverse motion of the drum is caused by the actuation of valve 513 (see also Figure 6) which is actuated by the axial movement of the drum to the left, as shown in Figures 6 and 46. Thus, air is supplied through valve 513 and conduit 740 (see Figure 68) to the cylinder 527 (see also Figure 57) for reversing the sprocket chain 529 and furnishing additional power to shaft 486 to reverse the drum.

At the same time that this drum reversal takes place and valve 513 opens, air is supplied through conduit 741 to reverse the action of cylinder 218, there being a greater pressure supplied to the piston for reversing because of the reducing valve 732 on the conduit supplying air for forcing the piston forward. This same action occurs in connection with cylinder 279, also cylinders 218' with reducing valve 732' and 279', as may be apparent from Figure 68. In connection with the cylinders 279 and 279' as there is no reducer in the lines to these cylinders, the same pressure will be supplied on both sides of the pistons of these cylinders and no motion will occur. Air supplied by conduit 741 also serves to supply rotation for indexing of the various plucker units to its second index position which is accomplished by the mechanism shown in Figures 15 and 16 through the actuation of the air valves cylinder for the right wing unit, 259a for the left wing unit, 259b for the right leg unit, and 259c for the left leg unit, all as shown connected to the line 741 in Figure 68. This line 741 also actuates cylinders 237 and 237' as shown in Figure 68 (see also Figure 12).

The reversing of the rotation of the telescopic portion of the leg units is accomplished by a spring attached to the flexible cord 278 as shown in Figure 60 at 745. As the drum 487 starts this reverse rotation, switches 542 (Figure 46) open, thus permitting valve 545 to close shutting off air to cylinder 495, permitting spring 497 (see Figures 6 and 46) to slide drum 487 to a starting position for indexing and the next stroke. As the drum again reaches the end of its motion to the right, as shown in Figure 6, the gears which drive the shaft 486 again start the drum rotating clockwise through a new cycle of operation so as to operate the pluckers on the leg and wing units as just above described. Six indexes occur while the cam 483 maintains gear 484 in engagement with gear 461, after which, the rocker arm 479 is shifted, while leaving the parts operated by drum 487 in the position of their backward or reverse stroke operation. As the rocker arm 479 operates, cam 467 permits valve 469 to close, thus shutting off the supply of air through conduit 727 and stopping all operation of the pluckers and their movement, leaving them in a resting or original position, and as air is shut off from the control gate which is operated by cylinder 453, the spring will swing gate 452 to the position shown in Figure 45, thus shifting the operation of the suction unit to conduit 451.

The next operation is that of cam 470 opening valve 471 (see Figure 6 and Figure 68) which valve stays open during substantially a half cycle of operation of the shaft 464, furnishing all of the air for the middle and tail plucking units and their actuation. This valve 471 supplies air through conduit 750 to cylinder 751 for forcing the tail unit upwardly by a mechanism which is the same as used in Figures 12-14 to move the wing plucking units inwardly, this particular cylinder 751 being hidden in the various views which are shown. Air is also supplied through conduit 750 to cylinder 752 (see Figures 3 and 4) which serves to move the carriage carrying the body and neck plucking units forwardly. Air is also supplied to cylinder 125 (see Figures 29 and 28, also Figures 3 and 4) which is the reversing cylinder for the neck unit and serves to hold this cylinder up against the ratchet engagement while the pluckers are operating. Air is also supplied by this conduit 750 to cylinder 151 (see also Figures 3 and 4) which is a reversing cylinder for the waist unit and serves to keep the waist unit up against its ratchet during the operation of the pluckers. Air is also furnished through valve 471 to branch conduit 753 to valve 488 which is operated by drum 478.

Air from the direct air line A is taken off through conduit 755 which leads to the pluckers 756 on the tail portion; pluckers 155 on the neck unit; and pluckers 156 on the waist unit, air being supplied to this conduit being controlled by valve 572 which is electrically operated (see also Figure 49). There is also branched from this conduit 755 a conduit 757 which leads to cylinders 203 on the neck unit and 203 on the waist. This conduit 757 is controlled by air valve 758 which is electrically operated, being energized from a source of power 759, as shown in Figure 68. The arrangement is such that air supplied through the conduit 755 is supplied through valve 758 which is open to permit air to pass to the units 203 which force the pluckers away from the body and neck and keeps them in this rearward position as the carriage advances forwardly. This air is also supplied as the vertical descending motion of the plucking units takes place.

It will be understood that gear 476 is in mesh with gear 461 and is rotating shaft 477, and the clutching mechanism between gear 476 and the shaft 477 engage to hold the two in driving engagement. Thus, the drum 478 is rotating counterclockwise so that the chains 490 and 491 (see Figures 1 and 6) operate to lift up carriage 95' (see Figures 3 and 58). This movement of carriage 95' upwardly is assisted by cylinders 574 and 575 which, now that the carriage is forward, come into operation by reason of air being supplied through the actuation of valve 488, conduits 760 and 761 which lead to these cylinders 574 and 575 (Figure 68). At the same time the air in conduit 761 enters the branch conduit 762 to actuate cylinder 237d to lift the telescopic portion of the tail pluckers upwardly, which mechanism is the same as shown in Figure 12. At the time the carriage for the tail pluckers is moving upwardly, air also actuates cylinder 763 (Figure 68) which moves the contact arm 764 from contact 765 to contact 766, thereby breaking the circuit to the valve 572, shutting off air to the tail pluckers 756 and closing the circuit to the air valve 758 which opens this air valve allowing air to enter conduit 757 and force the body and neck pluckers outwardly away from the bird, as shown in detail in Figures 41 and 42. When the unit reaches the top of its stroke, cam 487 permits valve 488 to again close, allowing the switch 464 to swing back to the position shown in Figure 68, thereby permitting the carriage to descend and the pluckers to commence operating by air being supplied thereto as the carriage descends.

Just as valve 488 closes, disc 780 (see Figure 61) is rotated so that arm 781 engages the cam surface 782 and throws the arm 781, as shown in Figure 61, out of engagement with the pin 784 which causes driving engagement between the gear 476 and the shaft 477, thus permitting rotation of the drum 478 which is now free from the gear 476 to be reversed. The weight of the carriage pulls the drum back to reverse position; the chains 490 and 491 unwind on the downward stroke of the carriage. As before said, the pluckers are in operation on the downward stroke.

As the neck pluckers 155 reach the body of the bird (see Figure 54) the switch 580 on the plucker 155 causes the solenoid valve 583 (see also Figure 68) to close, thus actuating the valve 584 and permitting air to enter through conduit 770 (Figures 54 and 68) to actuate cylinder 585 causing its plunger to engage the frame (see Figures 3, 58, and 54) so as to stop the carriage from further descending.

At the upper end of the stroke of the neck and body carriages, a plunger or valve 706 (Figures 3 and 68) engages the cam surface 707 to open valve 706 to permit air from the conduit 750 to enter the branch lines 771 and 772 into cylinders 125 and 111. The air in cylinder 125 serves to balance the pressure of the air on the opposite side of the piston in this cylinder, thus neutralizing the effect of cylinder 125 to hold the carriage against one of its ratchet teeth, and at the same time applying a pressure in cylinder 111 (Figure 28) to move the carriage in a horizontal plane about its central axis to a further index point or so that the arm 107' will engage another ratchet tooth 105 (Figure 28). As the carriage for the waist plucking units approaches the bottom end of its stroke, valve 700 (Figures 3 and 68) engaging cam surface 701 is opened to permit air to pass from line 750 to line 780 and supply air to cylinder 259d to rotate the tail portion when indexed and also to supply air to cylinders 151 and 140, as shown in Figure 68 and in Figure 34 and Figures 3 and 4, the air supply to cylinder 151 serving to balance the air on the other side of the piston in this cylinder, while air supplied to cylinder 140 serves to rotate the waist carriage for the pluckers in a horizontal plane about a vertical axis from one position of azimuth to the next index position.

The reversal of the drum 478 is accomplished during the time the arm 781 (Figure 61) rides over cam 782, it being understood that as soon as it has ridden over this cam, it again drops into engagement with the pin 784 to establish driving relation between the gear 476 and the shaft 477, and as this occurs, the drum is driven through another cycle of operations to wind up the chains 490 and 491 and again lift the carriage for the neck, waist, and tail units to perform a further cycle of operations, it being understood that as the carriage lifts up, the cylinders 203 are actuated to draw the pluckers back from the bird and at the same time the pluckers of the tail portion raise and approach the bird.

The cycle of operations on the neck, waist, and tail units is six times. Although the index is six times and there are six cycles of operation, it will be understood that the azimuth angle varies in the neck and body carriers, there being but two pluckers in the neck unit and three pluckers in the body unit. It will also be understood that as the pluckers are plucking on the downward stroke, the pluckers oscillate. It will be seen also as described in connection with Figure 37 that as the carriage for the waist pluckers rotates in azimuth, the pluckers themselves are directed at varying angles to the body or waist so as to present the pluckers at a more advantageous angle to the waist due to the configuration of the waist being different than a true circle. At the completion of the six vertical downward strokes of the neck and waist units, the cam 474 actuates valve 475 (see Figures 6 and 68) which through conduit 790 actuates cylinder 791 to return carriage 83 rearwardly to starting position, leaving gear 476 in mesh with gear 461 for the start of the next complete cycle of the machine, and cam 465 rides off of switch 466 thereby stopping the machine as one complete cycle of operation has been performed. It is then merely necessary to remove the plucked chicken or bird from its wing, leg, tail, and neck clamps.

I claim:

1. In a plucking machine, a supporting means, bird gripping means mounted stationary on the supporting means to hold a bird, and a feather plucking means movably mounted on said supporting means adjacent the gripping means.

2. In a plucking machine as in claim 1 wherein there are individual plucking means for the neck, tail, wings and legs of the bird each mounted on a movable carriage.

3. In a plucking machine as in claim 1 wherein there are means to move the plucking means relative to the supporting means.

4. In a plucking machine as in claim 1 wherein the bird gripping means comprises a plurality of gripping units spaced for engaging the neck, tail, wings and legs of the bird.

5. In a plucking machine as in claim 4 wherein there are a plurality of plucking means with one adjacent each gripping unit.

6. In a plucking machine as in claim 5 wherein there are individual means to move each of the plucking means relative to the supporting means and means to independently control the operation of each of the moving means.

7. In a plucking machine as in claim 6 wherein there are means to provide sequential operation of the control means.

8. In a plucking machine as in claim 1 wherein there are conduit means from said plucking means leading to a common location for depositing the plucked feathers.

FOSTER FISHER.

REFERENCES CITED

The following references are of record in the file of this patent:

UNITED STATES PATENTS

| Number | Name | Date |
|---|---|---|
| 920,566 | Griggs | May 4, 1909 |
| 1,809,891 | Dunner | June 16, 1931 |
| 1,889,228 | Swanson | Nov. 29, 1932 |